United States Patent

[11] 3,604,701

[72] Inventor George F. Hawley
 Bogota, N.J.
[21] Appl. No. 681,267
[22] Filed Nov. 7, 1967
[45] Patented Sept. 14, 1971
[73] Assignee Ivanhoe Research Corporation
 c/o Robert A. Hack, New York, N.Y.

[54] PROCESSES, SYSTEMS, AND COMPOSITE SYSTEMS FOR AUTOMATING THE MANUFACTURE OF WEARING APPAREL, HEADGEAR, FOOTWEAR, COMPONENTS THEREOF AND SIMILAR PRODUCTS
10 Claims, 37 Drawing Figs.

[52] U.S. Cl. .................................................. 270/58,
 112/121.11, 112/121.29, 223/1
[51] Int. Cl. ..................................................... B65h 39/02
[50] Field of Search ........................................ 112/121.11;
 270/58

[56] References Cited
UNITED STATES PATENTS
3,054,612 9/1962 Godlewski.................... 270/58
3,420,515 1/1969 Off et al....................... 270/58 X Primary Examiner—Robert W. Michell
Assistant Examiner—L. R. Oremland
Attorney—Bryan, Parmelee, Johnson & Bollinger ABSTRACT: Processes, systems, and composite systems for automating the manufacture of wearing apparel, headgear, footwear, components thereof and similar products (herein called "garments, garment components, and the like articles") providing automatic handling of fabric workpieces to pass them through a multiplicity of work stations and to combine various sizes and shapes of workpieces to produce garments, garment components and the like articles, including steps of automatically feeding stacks of fabric workpieces into cooperative relationship with the respective systems of machine groups wherein the stacks of workpieces are carried by transportable interchangeable coordinating preregistration worktables which cooperatively fit with the respective systems in the composite to which these preregistration worktables are addressed, said transportable worktables serving as an integral part of the machinery to which they are addressed, interacting with the machinery to provide preregistration frames of reference and coordinate control passing the stacks from system to system, taking the workpieces one at a time from the preregistered stacks while differentiating the respective workpieces from the next ones in the stack, putting the workpieces into registry stations, registering them in the registry stations to bring them into more accurately known coordinate positions, combining them with other workpieces, transferring them into work stations and passing them through the work stations, performing work functions thereon and putting those workpieces which have had work functions performed thereon into subsequent stacks in appropriately preregistered positions upon other transportable interchangeable coordinating pregregistration worktables for automatically addressing these preregistered stacks in proper presentation to subsequent systems of the composite without requiring manual rearrangement of the individual workpieces to effect compatibility with the subsequent systems.

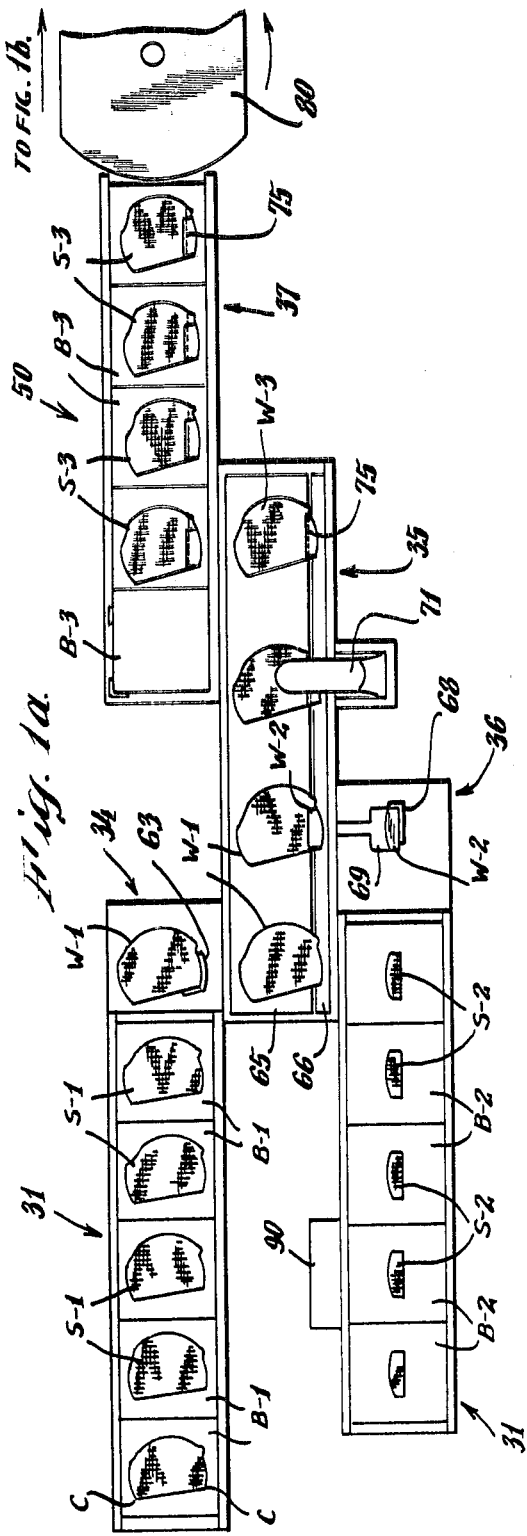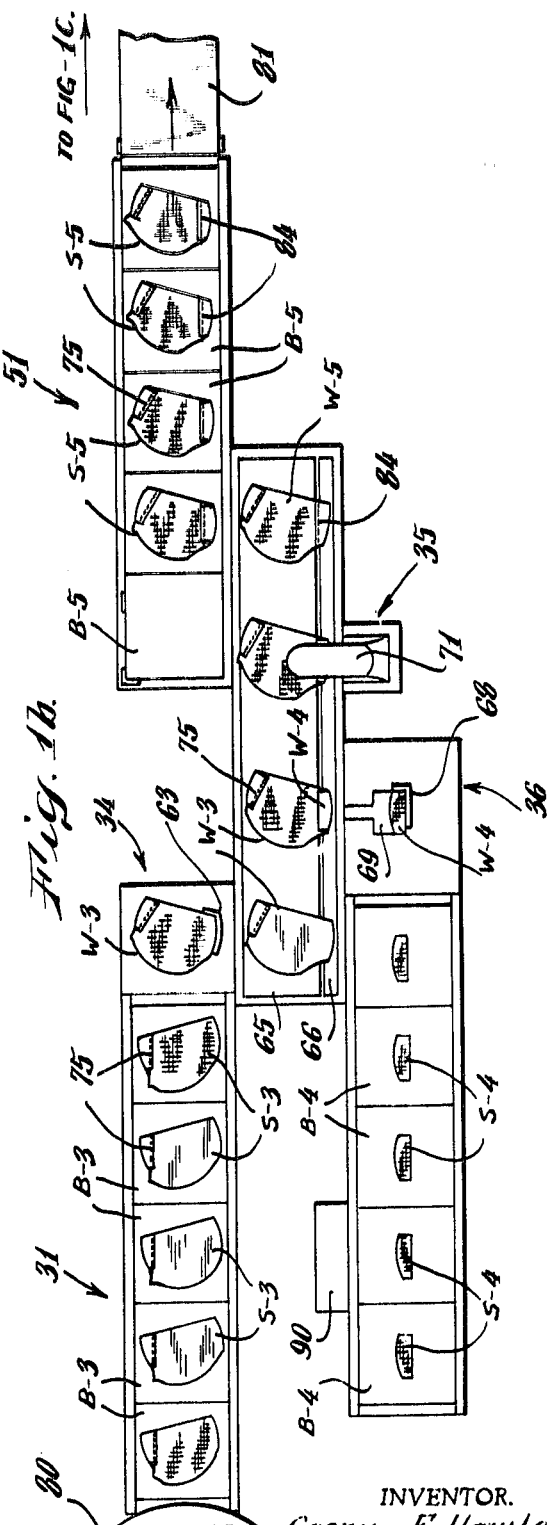

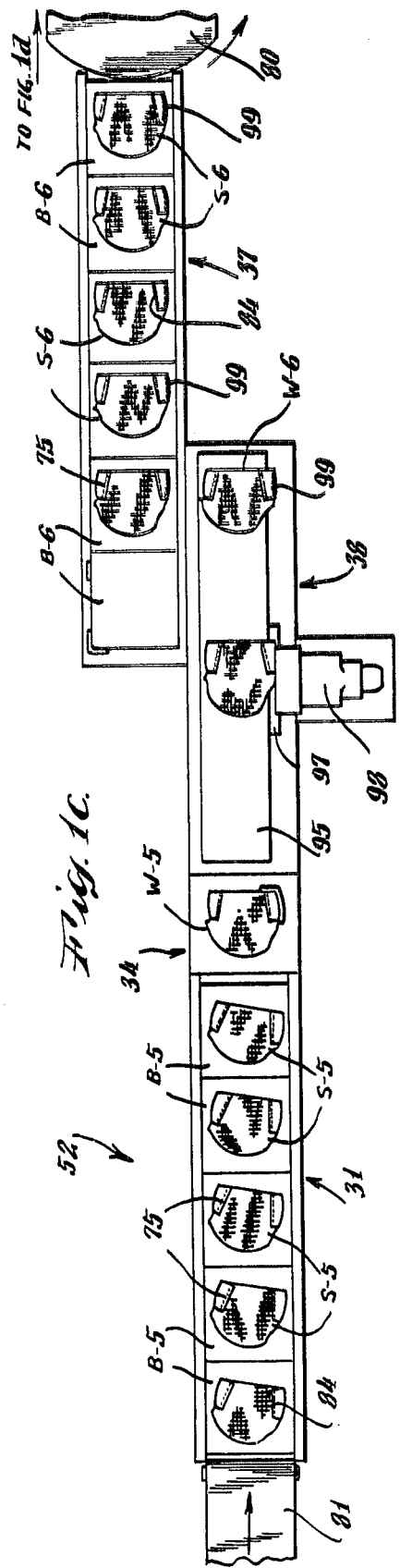

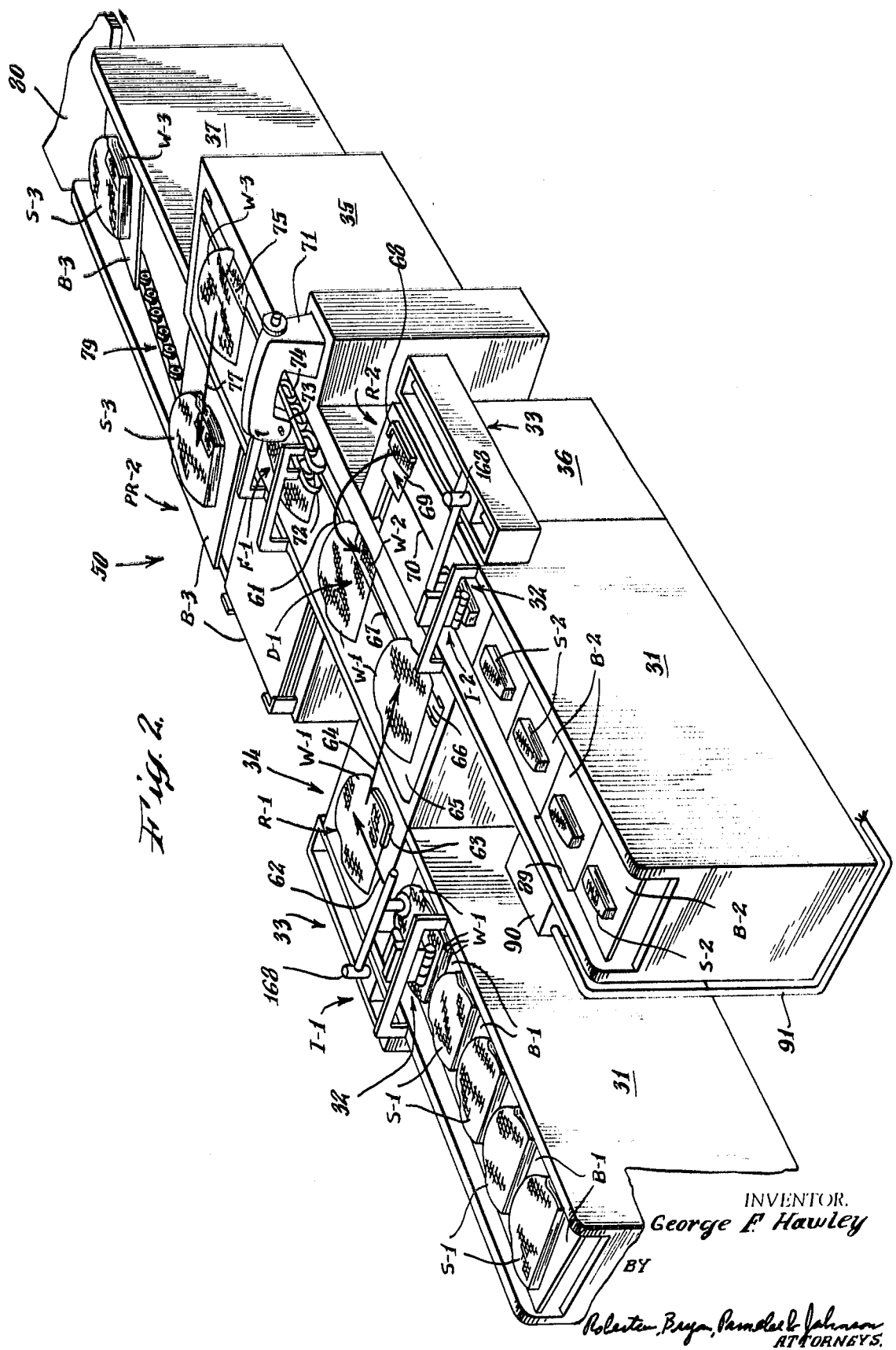

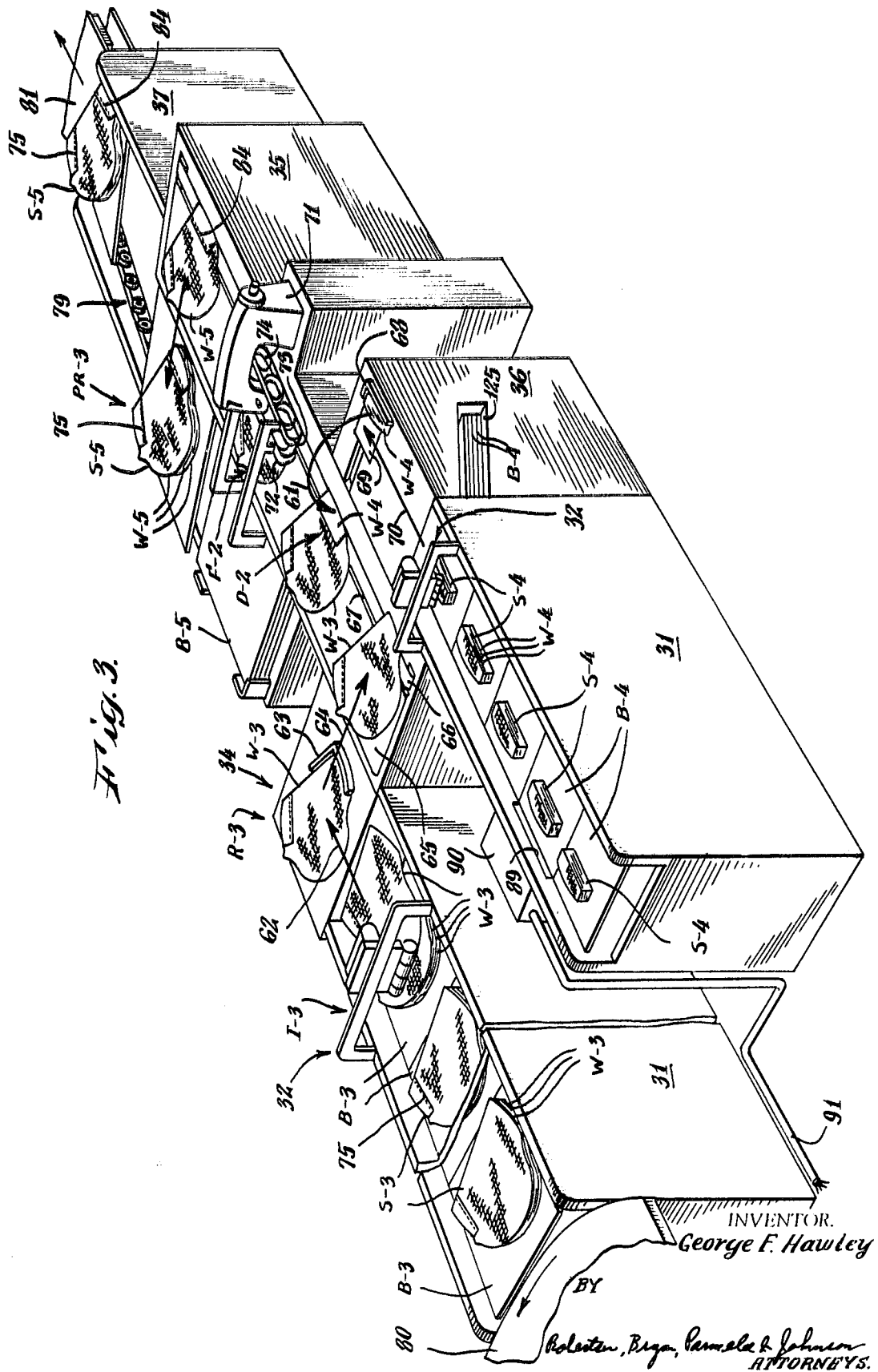

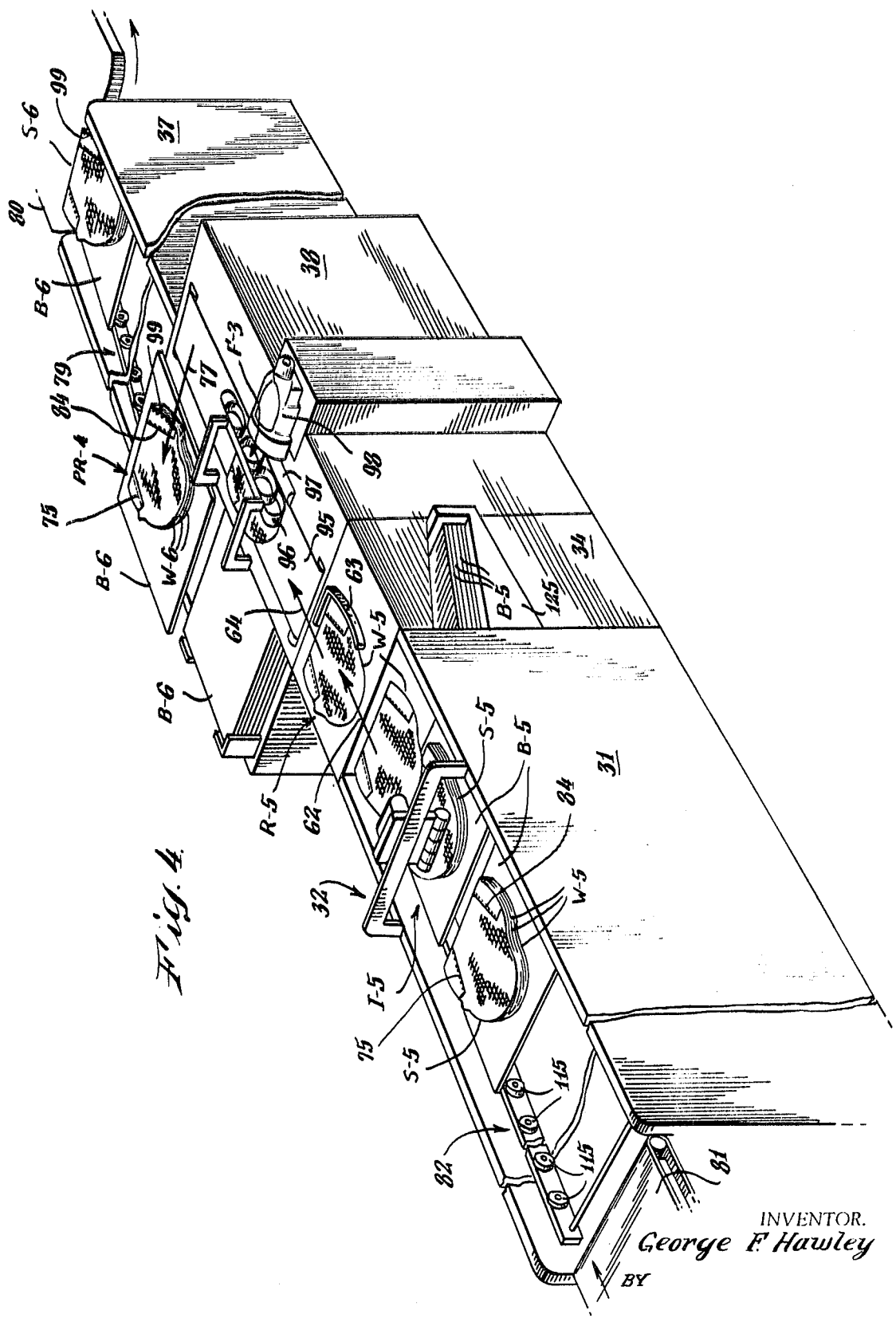

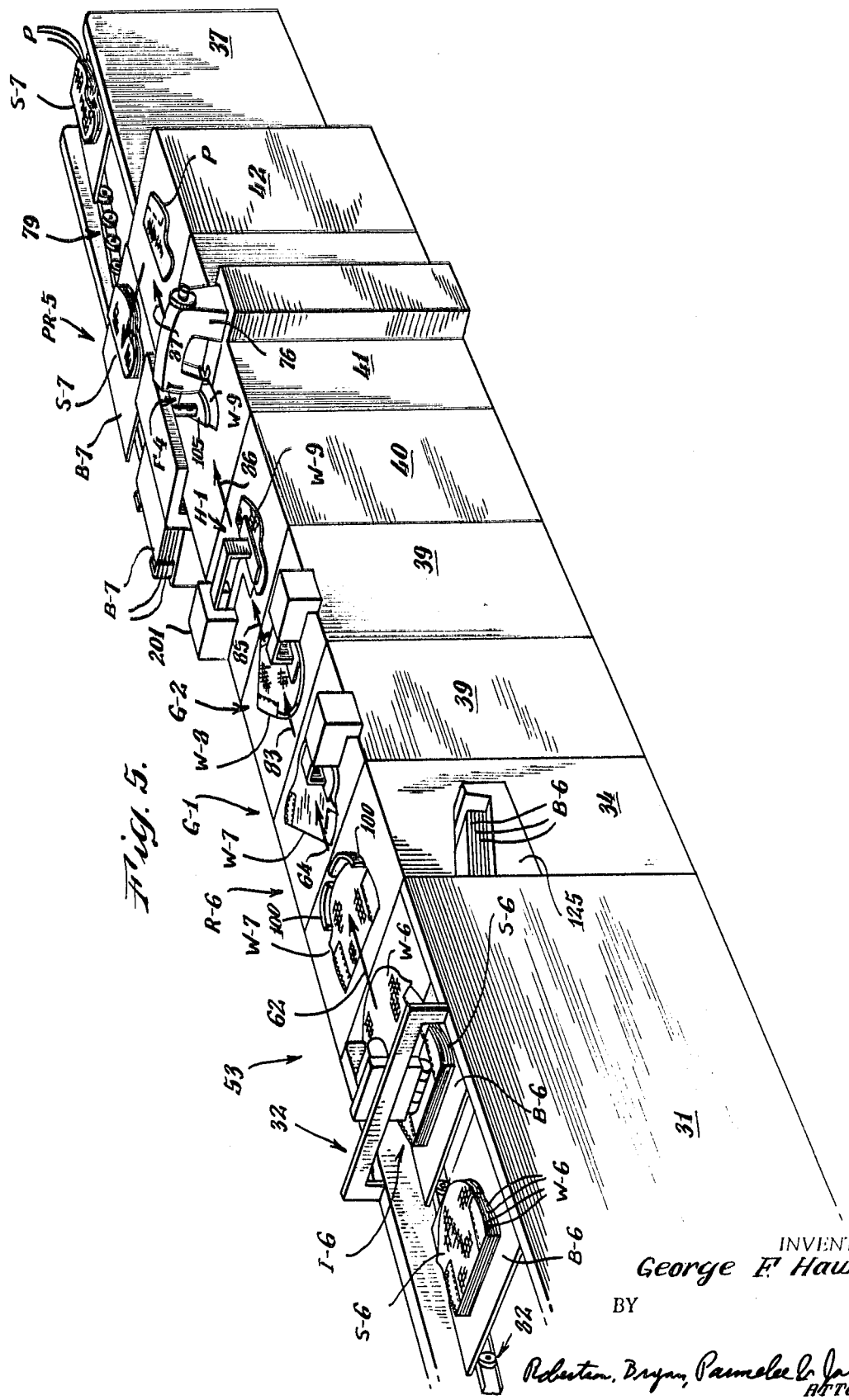

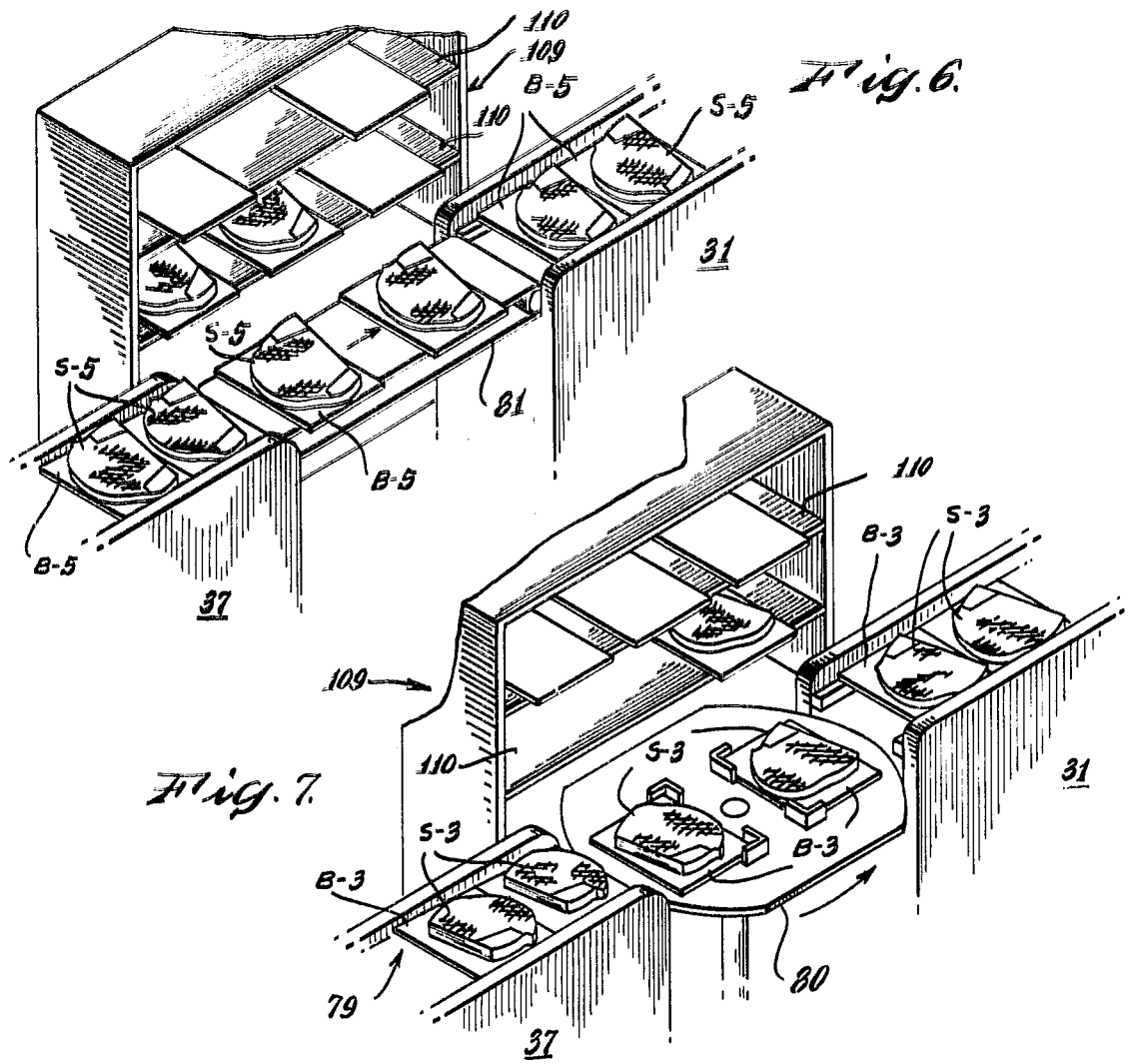
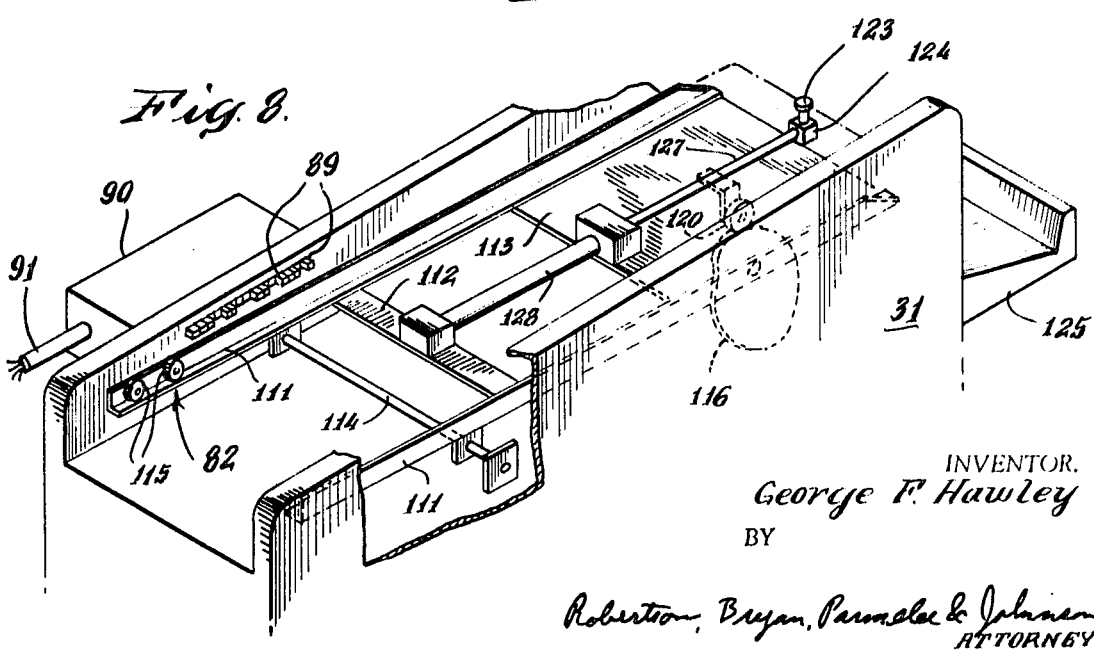

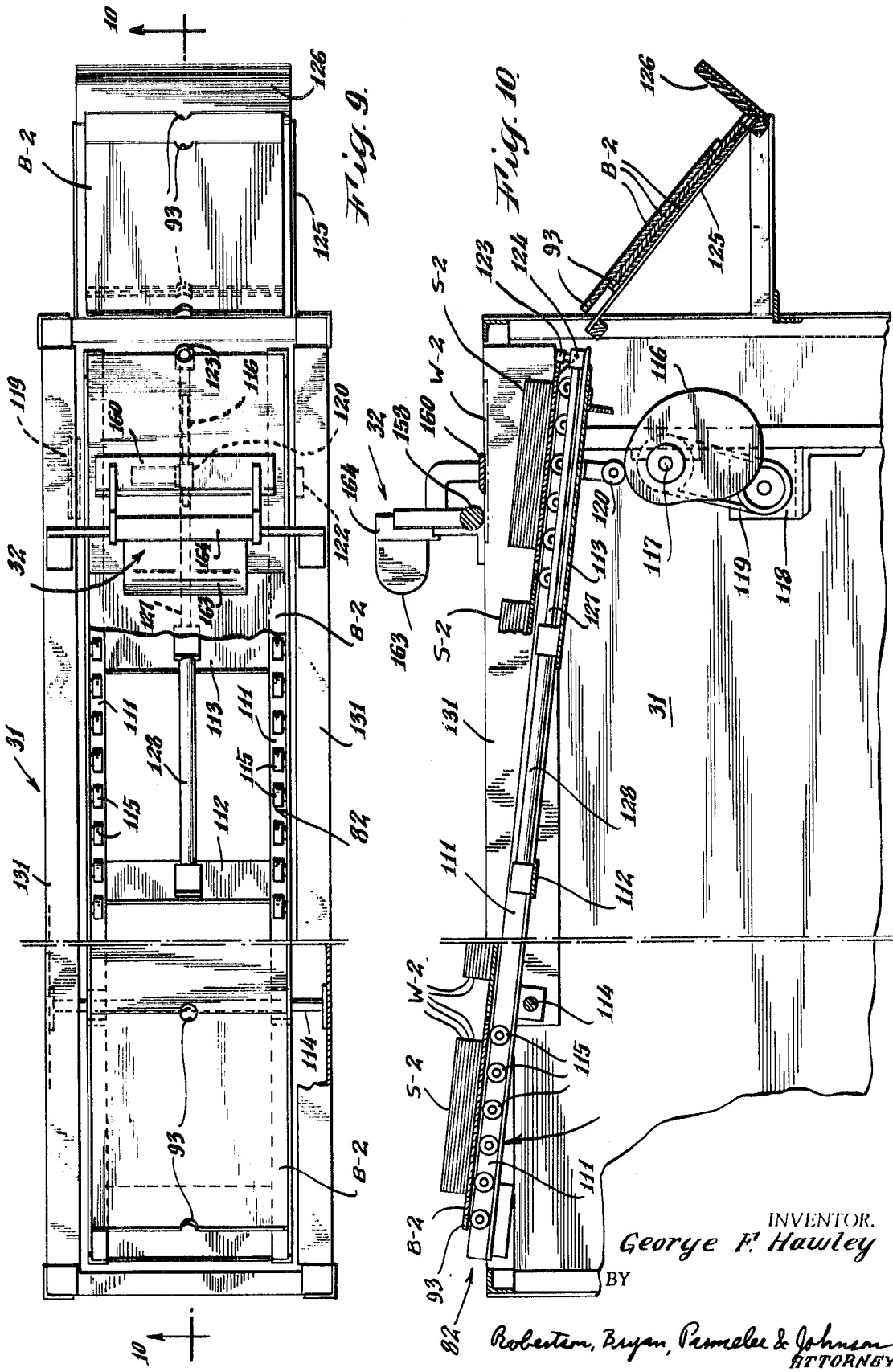

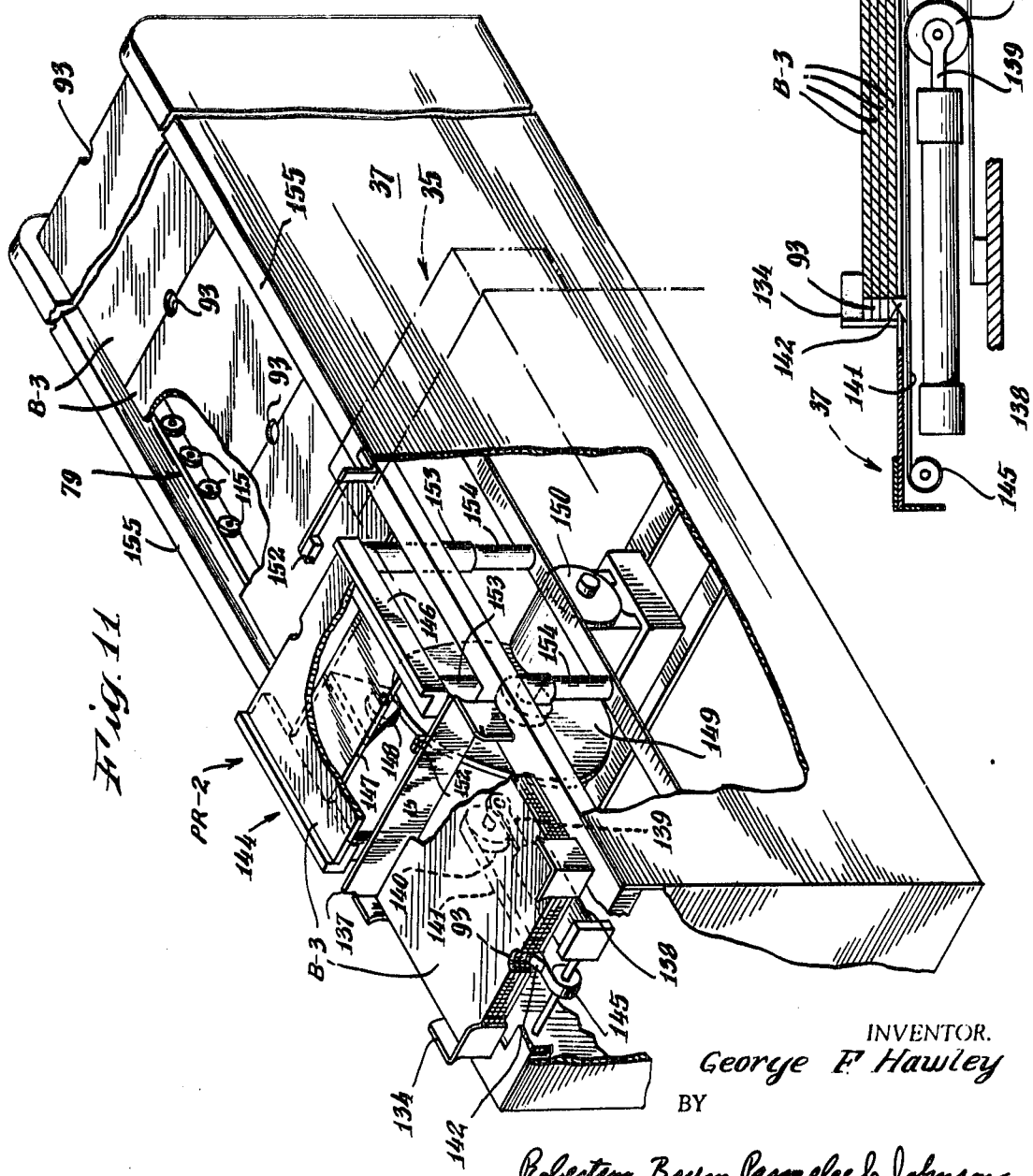

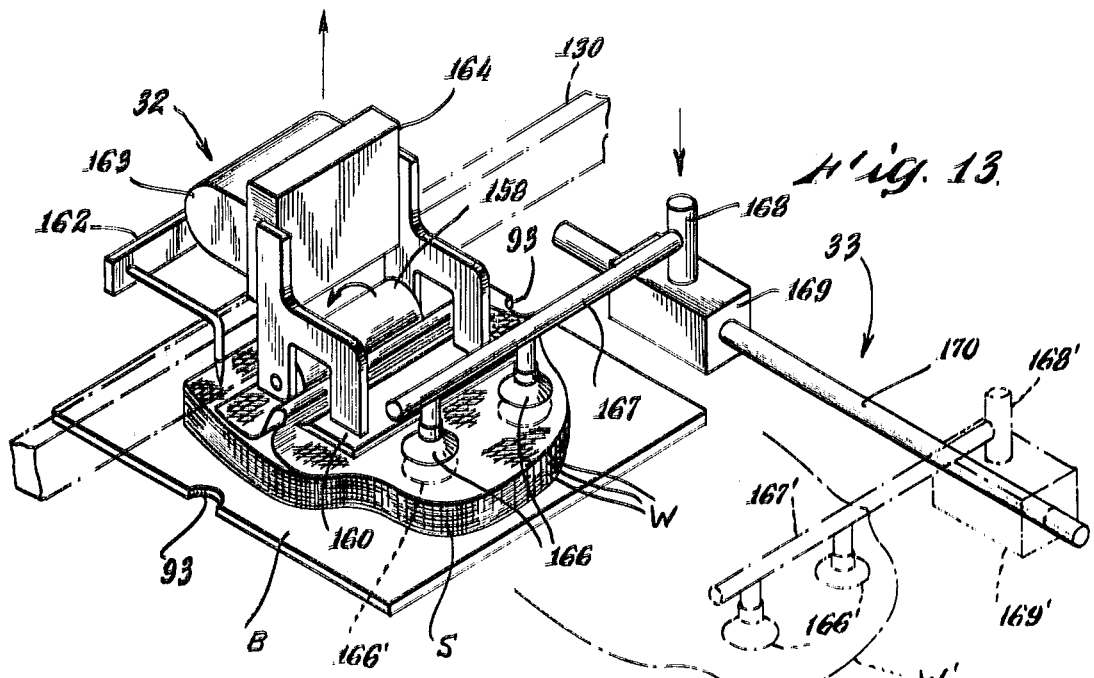
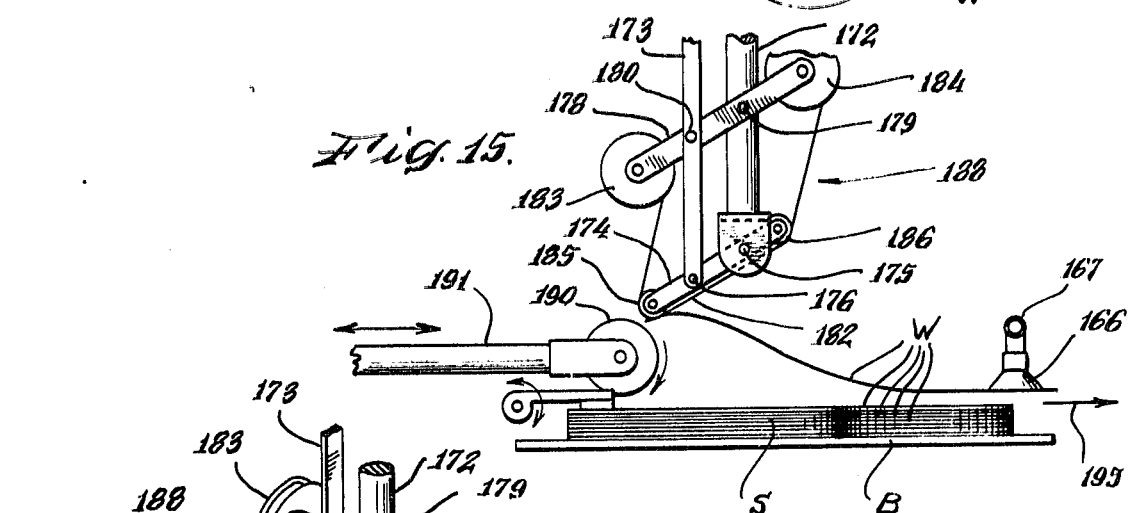
INVENTOR.
George F. Hawley

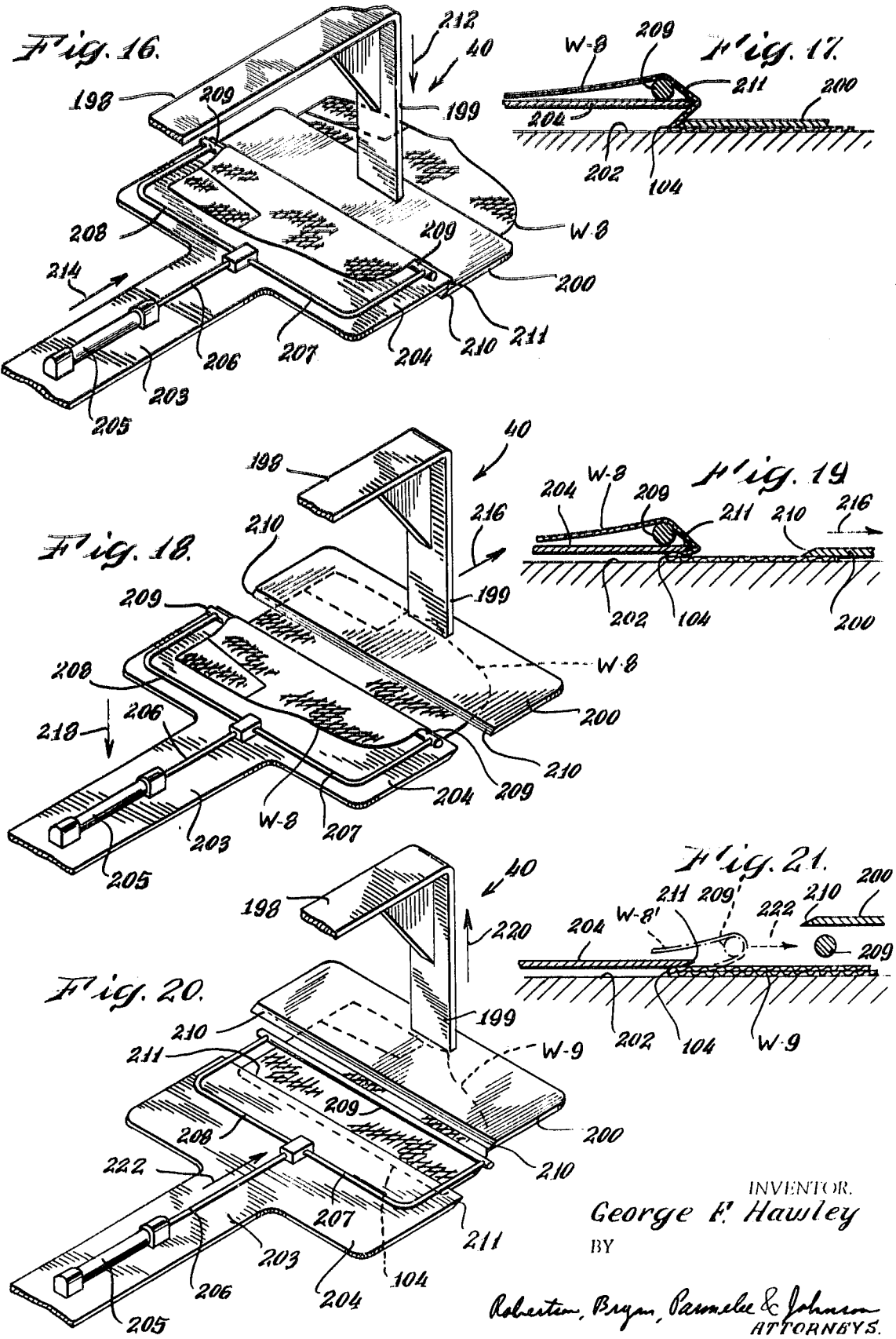

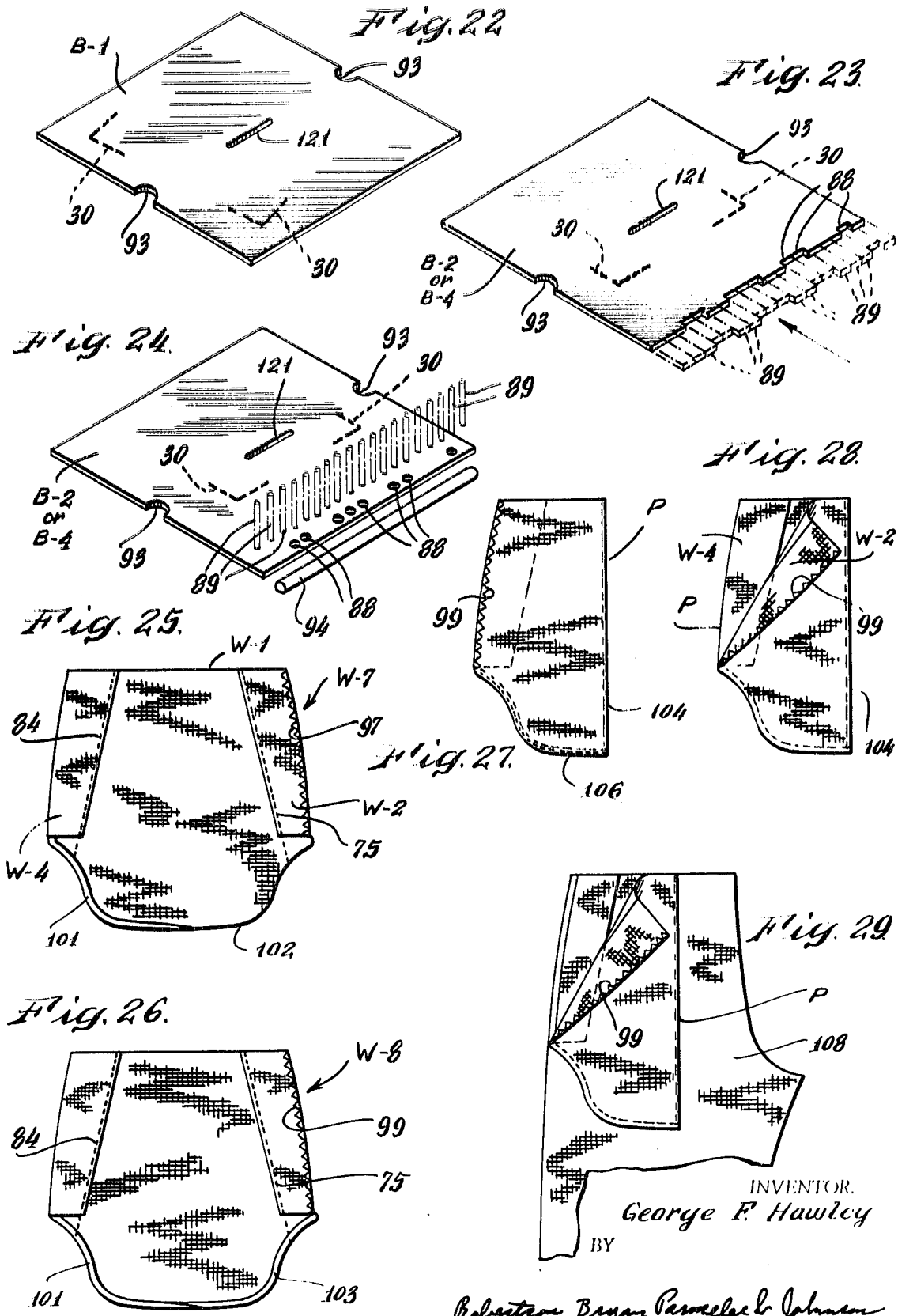

PROCESSES, SYSTEMS, AND COMPOSITE SYSTEMS FOR AUTOMATING THE MANUFACTURE OF WEARING APPAREL, HEADGEAR, FOOTWEAR, COMPONENTS THEREOF AND SIMILAR PRODUCTS

In the process, systems, and composite systems embodying the present invention the identity and relative order or interrelationship of the respective workpieces is maintained by the transportable interchangeable coordinating preregistration worktables so that those workpieces of the desired color and characteristics are properly combined without requiring manual intervention in producing the articles, in other words, workpieces which "belong" together are automatically assembled together in the finished garment, garment component and the like article, the transportable interchangeable coordinating worktables providing preregistration frames of reference as interconnecting links between machine and fabric workpiece for marrying the preregistered stacks of workpieces (nonengineered items) with the subsequent systems, these being shown as carrying indicia providing programming data relative to the characteristics of the workpieces carried thereon, and the interaction between these transportable interchangeable coordinating worktables and the in-feeding and out-feeding machine modules of the respective systems providing capability to handle temporary storage of inventory, i.e. "surges," caused by statistical variations in the production rate of the respective systems arising from unforseen work stoppages such as minor breakdowns, need to change or replace fastening means such as to replace broken threads in sewing machines, etc.

The systems are built up of groups of modular machines, each such machine or module having a predetermined size and shape so that the respective modules can be fitted together in many different ways in a wide variety of systems for performing one or more work functions upon the respective workpieces, thus providing flexibility and versatility in installations for convenient reassembly of the modules as may become desirable in the future to create changes in the systems and the composite systems to respond to or accommodate changes in the articles produced and work functions performed, arising from unanticipated style changes, variations in marketing demand or major changes in the products desired to be manufactured, so that the manufacturer is not "locked in" by his capital investment but rather is provided with a great latitude and flexibility to adapt to unforseen contingencies arising in the future.

This invention relates to processes, systems, and composite systems for automating the manufacture of wearing apparel, headgear, footwear, components thereof, and the like products, and more particularly, to processes and systems wherein the respective fabric workpieces are automatically brought together so as to combine them in proper relationship fastened together to produce the desired products.

As background of this invention, it is noted that the garment industry has operated for decades on the basis of the bundle system. The bundle arises out of the cutting of the goods in the cutting room, the bundles being tied by string and tagged between each operation to move them about and to keep track of their whereabouts. The garment industry has heretofore utilized sewing machines having attachments associated with the machines for helping the operator to perform work on the goods. The tied-up bundles have been brought to the operator who opened up the string to free the bundle from its restraint and then manually fed the pieces of goods one at a time into the sewing machine equipment. In virtually all cases the operator guided the individual pieces past the sewing station to produce the desired stitching path. After having performed the desired stitching operation on all of the pieces from the bundle the operator tied up the bundle and retagged it for carrying it over to the next operator, who thereupon opened the bundle and performed the desired work on the goods therein, thereafter retying the bundle and so forth. The string which tied up the bundle imposed a three-dimensional restraint upon the workpieces in the bundle necessitating that it be opened prior to performing work on the individual pieces of goods therein and necessitating that the bundle be closed up after the operation was performed, enabling the bundle to be carried from location to location to be available to the various human operators at these locations in the plant, with a tag providing identification with respect to the goods in the bundle.

Advantageously, the transportable interchangeable coordinating preregistration worktables or boards impose only two-dimensional restraint upon the stack of workpieces being transported thereon. That is, the friction between the transportable worktable or board and the bottom of the stack and between the individual pieces of the stack restrains the workpieces from moving forward or backward and from moving left or right with respect to the transportable boards, thus restraining the workpieces in two dimensions, but the stack is free of vertical restraint, thus eliminating one of the restraints which has been required by the prior art. By transporting the stacks of workpieces on the interchangeable coordinating preregistration boards, and by interfitting these boards with the machinery, the location of the top workpiece of the stack becomes automatically known within plus or minus predetermined substantial variations in spite of the fact that the stack itself is subjected solely to two-dimensional restraint. Thus, advantageously the top workpiece is brought into preregistered relationship with respect to the machinery, the transportable interchangeable coordinating preregistration board forming a cooperating integral functional machine element of the preceding and succeeding systems of modular machinery.

As further background of the present invention it will be helpful to the reader to refer to my prior copending joint application with John H. Buettner, Ser. No. 475,986, filed on July 30, 1965, wherein methods and apparatus are shown for automatically transferring and registering fabric workpieces and for combining them. In the methods and apparatus as shown therein the workpiece to be registered is moved into an initial general location upon a worktable, the position of the workpiece being generally known in said initial location, and then the workpiece is brought into registered position in the registration station on the worktable so that the position of the workpiece becomes accurately known with respect to the work-performing machinery. In said prior application the initial general location of the workpiece and its subsequent registration both occur in the same system.

A further advantage of the present invention results from the fact that I have purposely broken up into two parts the mechanism for accurately registering the workpieces with respect to other work-performing machinery and with respect to other registered workpieces in the system. These two parts are as follows: (1) a worktable upon which the final accurate registration occurs which worktable is included in the system with the work-performing machinery, and (2) a transportable interchangeable coordinating worktable or board upon which the workpiece is brought into a stack at the output of a preceding system in an approximately known preregistration position or relationship with respect to the work-performing medium and with respect to the related or potentially related workpieces in other stacks upon other transportable interchangeable coordinating worktables or boards in the system, this preregistration stacking occurring at the output of the preceding system. These transportable coordinating preregistration boards serve as interlinking frames of reference in the composite automation system. At one time each of these coordinating boards functions as an integral, functional machine element of the stacking module at the output of one system wherein certain work was previously performed on the workpiece, and at a later time each of these boards functions as an integral, functional machine element of a feeding module at the input of a succeeding system where subsequent work is to be performed on the workpiece presenting the workpieces thereto in appropriately preregistered positions.

In the prior art there are sewing machines having attachments for automatically moving material and for handling the material in various ways. Nevertheless, these prior machines are such that they require substantial amounts of human attention and labor in making a product from fabric workpieces. At the present time, the garment industry is characterized by substantial amounts of tedious repetitious, monotonous hand labor in producing goods. The present invention is intended for automating this field to enable automation systems to be used to relieve human beings of the need to perform much of this drudgery and to reduce cost of making such products.

It is an object of the present invention to provide processes, systems, and composite systems for automating the manufacture of wearing apparel, headgear, footwear, components thereof and similar products.

As used herein the term "fabric" is intended to include woven goods and also nonwoven, knitted, felted, absorbent, imperforate or perforate goods having a fabriclike texture suitable for use in clothing, headgear, footwear, components thereof and similar uses, regardless of whether the material of the goods is in one layer or multiple layers and regardless of whether the goods are natural, synthetic, or blended and regardless of whether the goods include animal fibers, vegetable fibers, paper material, or combinations thereof. The term "workpiece" is intended to include individual pieces as well as subassemblies or semifinished goods including two or more pieces or components secured together by suitable fastening, such as by sewing, heat-sealing, adhesive bonding, cementing or any suitable fastening work which may be used to manufacture garments, garment components and similar products.

In this specification and in the accompanying drawings are described and shown processes, systems and composite systems for automating the manufacture of wearing apparel, headgear, footwear, components thereof, and the like products, illustratively embodying the present invention, but it is to be understood that these illustrative examples are not intended to be exhaustive nor limiting of the invention. These illustrations are given so as to disclose the invention fully and clearly to those skilled in the art and so that the reader will appreciate how this invention can be adapted and modified in various forms each as may be best suited for the conditions of a particular manufacturing plant requirement.

The various objects, aspects and advantages of the present invention will be more fully understood from a consideration of the following description in conjunction with the accompanying drawings wherein similar reference numbers refer to corresponding parts throughout and in which:

FIGS. 1A, 1B, 1C and 1D are plan views illustrating process and showing four interrelated systems of a composite system for automatically manufacturing a pocket component, that is a side pocket, of the type which is often included in a pair of men's pants. The arrow and legend at the right of FIG. 1A are intended to indicate that the stacks of preregistered workpieces transported by the interchangeable coordinating worktables or boards that are being fed out from the output of the system of FIG. 1A are being addressed to the input of the system shown in FIG. 1B, there being a turntable conveyor between the systems of FIGS. 1A and 1B for turning the workpieces by 180°. The arrow and legend at the right of FIG. 1B indicate that the preregistered stacks of workpieces transported by the interchangeable coordinating boards that are being fed out from the output of the system of FIG. 1B are addressed to the input of the system of FIG. 1C, there being a conveyor between the systems of FIGS. 1B and 1C for automatically presenting the workpieces in compatible relationship to the system of FIG. 1C. Also, the arrow and legend at the right of FIG. 1C indicate that the preregistered stacks of workpieces are being addressed to the input of the system of FIG. 1D, there being a turntable conveyor between the systems of FIGS. 1C and 1D, as will be explained in detail further below;

FIG. 2 is a perspective view of a system corresponding to the plan view of FIG. 1A;

FIG. 3 is a perspective view of a further system component of the composite system. This system of FIG. 3 corresponding with the plan view shown in FIG. 1B;

FIG. 4 is a perspective view of a still further system forming a component of the composite system, the system shown in FIG. 4 corresponding with FIG. 1C;

FIG. 5 is a perspective view of the still further system of the composite system which completes the assembly of the pocket product and delivers this completed product in a stack at the output or delivery station;

FIG. 6 is a partial perspective view of intervening conveyor equipment which passes the transportable interlinking coordinating boards between the respective systems, for example for connecting the system shown in FIG. 3 with the system shown in FIG. 4 and associated storage equipment capable of providing temporary storage of the respective workpieces for accommodating "surges" in the production flow occasioned by one of the systems being rendered inactive for a period of time, for example such as the delay occasioned by the necessity of rethreading a sewing machine, or of making a minor repair;

FIG. 7 is a partial perspective view of intervening rotary conveyor mechanism between two of the systems wherein it is desired to change the orientation of the workpiece before it is fed into the succeeding system. For example, in going from the system of FIG. 1A to 1B the orientation of the workpieces is turned 180° as provided by the rotary conveyor. Moreover, FIG. 7 shows temporary storage for accommodating a temporary delay or surge in production flow;

FIG. 8 is a perspective view of a feeder module for feeding the workpiece-carrying coordinating preregistration boards into functional cooperation with the system;

FIG. 9 is a plan view of the input feeder module of FIG. 8;

FIG. 10 is an elevational sectional view of the input feeder module taken along line 10—10 of FIG. 9;

FIG. 11 is a perspective view of an output feeder module for stacking the workpieces into preregistered positions onto respective transportable boards and for automatically feeding them out of the system in readiness for entering the nest system;

FIG. 12 is a partial sectional view taken along the line 12—12 of FIG. 11 showing the mechanism for automatically feeding the transportable worktables or boards one at a time into position for receiving the respective workpieces thereon one at a time in preregistered position as the stack is built upon the board in readiness to be addressed into the next system;

FIG. 13 is a perspective view of differentiating and transferring means for automatically, reliably separating the top workpiece off from a stack of similar workpieces and for transferring this separated top workpiece over into the registration station of the system as indicated by the dotted outline;

FIG. 14 is a perspective view of an alternative means of differentiating the top workpiece from the stack and for transferring it over to the registration station in the system;

FIG. 15 is a side elevational view of the differentiating and transferring means of FIG. 14 shown in a succeeding stage of operation;

FIGS. 16 through 21 illustrate the operation of a folding and creasing module of the system shown in FIG. 5. FIG. 16 is a perspective view of the operating parts in an initial operating relationship, and FIG. 17 is a sectional view taken along the lines 17—17 of FIG. 16, illustrating in detail the relationship of the parts;

FIG. 18 is a perspective view of the operating parts in a sequential stage of operation, and FIG. 19 is a sectional view taken along the line 19—19 thereof illustrating this same relationship of the parts;

FIG. 20 is a perspective view of the parts near the end of the sequence of operation of the folding and creasing operation, and FIG. 21 is a sectional view showing this same relationship of the parts;

FIGS. 22, 23 and 24 illustrate various configurations of the transportable interlinking coordinating worktables or boards for carrying the respective stacks of workpieces in preregistered relationship. In FIG. 23 the board carries programming indicia for cooperation with the sensing mechanism in the input feeder module for indicating the characteristics of the workpieces which are being carried in the stack thereon; and FIG. 24 illustrates a further form of programming indicia which may be carried by the boards;

FIG. 25 is a top plan view of the pocket illustrating a first creasing of the raw edge along an increment thereof, and FIG. 26 shows a completion of the creasing along the raw edge;

FIG. 27 shows the pocket folded in half and creased and stitched together so as to be completely assembled;

FIG. 28 shows the pocket partially opened to show the opening into which the user's hand may be inserted; and FIG. 29 illustrated the intended final relationship of the pocket to a pants leg panel of a pair of men's pants.

With reference in greater detail to the drawings, processes, systems and a composite system embodying the invention for automating the manufacture of garments, garment components and the like articles are illustratively shown to combine and fasten together various sizes and shapes of workpieces and to perform work functions thereon to produce garment components, which are illustratively shown as pockets of the type commonly included in the sides of men's pants. The processes shown include steps of automatically feeding stacks S of fabric workpieces W into cooperative relationship with the respective systems of machine modules wherein the stacks of preregistered workpieces are carried by transportable interlinking coordinate worktables or boards B adapted to fit cooperatively with the respective systems in the composite to which these transportable worktables or boards are addressed. These transportable worktables B serve sequentially as integral parts of the outfeed modules from which they are addressed and of the infeed modules in the succeeding systems to which they are addressed. Thus, these worktables or boards interact with the machinery to provide preregistration frames of reference and coordinate the workpieces W in passing the stacks of workpieces from system to system of the composite automation system.

This illustrative example of the invention is a composite automation system for making side pockets for men's pants, the composite system of FIGS. 1A to 1D, inclusive, includes four cooperating systems 50, 51, 52, and 53 for performing different work functions to complete the pocket product P being made. In feeding the workpieces into the respective systems 50, 51, 52, and 53, they are taken one at a time from the preregistered stacks while differentiating the respective workpieces W from the next ones in the stack, putting the workpieces into registry stations in the systems, registering them in the registry stations to bring them into more accurately known coordinate positions in the systems which will perform work functions thereon.

The systems 50, 51, 52 and 53 are shown combining certain workpieces with other workpieces for fastening the workpieces together, transferring them into work stations and passing them through the work stations, performing work thereon and putting those workpieces which have had work functions performed thereon into subsequent stacks 5 in appropriately preregistered positions upon other transportable interlinking coordinate boards B for automatically addressing these preregistered stacks in proper presentation to subsequent systems of the composite system without requiring manual rearrangement of the individual workpieces to effect compatibility with the subsequent systems.

In the system of FIGS. 1A and 2 the larger fabric workpieces W–1 are panels of cloth which have been cut out in the cutting room in stacks S–1. Each of these cloth panels has the same shape which is one suitable for forming pocket bags. The stacks S–1 include a predetermined number of workpieces W–1, for example two dozen in each stack. The stacks are each placed in desired preregistered positions upon their respective transportable boards B–1, this preregistration of the stacks may conveniently be done in the cutting room where the stacks are cut out from laid up layers of the pocket bag fabric.

The boards B–1 include index marks 30 (FIG. 22) thereon indicating the desired preregistered positions of two spaced, prominent portions of the workpieces of the stacks S–1, such as two corners C (FIG. 1A) of the stack, but the preregistration positioning of the stacks on the boards is not required to be accurate. As long as the corners of the stack are located on a predetermined side of the index marks 30 (FIG. 22), i.e. "behind" such marks, and within approximately 1 inch of the index marks 30, this is a sufficiently accurate preregistration. Moreover, instead of doing this preregistration in the cutting room it may be done by an operator in the plant near the infeed modules of the systems. The advantage of doing the initial preregistration in the cutting room is that the boards B–1 may then be used conveniently to transport the stacks S–1 to the systems.

In the systems of FIGS. 1A and 2, the smaller fabric workpieces W–2 are backfacings to be fastened to the pocket panel workpieces W–1, these workpieces W–2 being in stacks S–2 each having the same number of workpieces as the stacks S–1. Two prominent portions such as the two corners C of the stacks S–2 are preregistered with index marks on the respective transportable interlinking coordinate worktables or boards B–2 in a manner similar to that described above with respect to the stacks S–1.

The respective worktables or boards B–1 and B–2 are being fed into substantially identical infeed modules 31 of the workperforming system generally indicated at 50. This system is built up of a group of modular machines, providing the various stations in the system. Each such machine or module has a predetermined size and shape so that the respective modules can be fitted together in many different ways in a wide variety of systems for performing one or more functions upon the respective workpieces, thus providing flexibility and versatility in installation for convenient reassembly of the modules as may become desirable in the future to create changes in the system to respond to or accommodate changes in the articles produced and work functions performed, arising from unanticipated style changes, variations in marketing demand or major changes in the products desired to be manufactured.

In the particular system 50 as shown in FIGS. 1A and 2, the basic dimension of the modules is 2 feet by 2 feet in the horizontal plane, which is illustrative of a suitable modular dimension for use in a system of this type. This same modular dimension of 2 feet by 2 feet also applies to other systems 51, 52 and 53 of this composite automation system. It is to be understood that other modular dimensions may be chosen depending upon a particular plant installation and upon the relative sizes of the workpieces being handled, as will be appreciated by those skilled in the art.

The particular system 50 as shown includes the following modules:

1. a pair of infeed modules 31,
2. a pair of top workpiece separating and differentiating modules 32,
3. a number of transfer modules 33 (only two of these transfer modules being shown, for clarity of illustration, and the presence of the other transfer modules being indicated by appropriate transfer arrows),
4. a registration module 34 for registering the pocket panel workpieces W–1 into accurately known position,
5. a belt conveyor stitching module 35, which has a substantial length extending along the central portion of the system, a multiple of 2 feet,
6. a registration and swing-over combining module 36 for registering the backfacing workpieces S–2 and for swinging each such registered workpiece up and over so as to deposit it upon the workpiece W–1 in the desired location as indicated by the arch-shaped arrow 61, and
7. at the output of the system 50 is a stacking module 37 which supplies transportable worktables or boards B–3 upon which the sewn workpieces W–3 are stacked in preregistered location to form stacks S–3, each stack having the same number of workpieces as in the stacks S–2.

In operation of the system 50 the separating and differentiating module 32 which is shown at the left side of FIG. 2 and which is located at the infeed station I-1 serves partially to separate and differentiate top workpiece W-1 from the remaining workpieces in the stack S-1. Then as indicated by the arrow 62, the transfer module 33 transfers this partially separated top workpiece over into a registration station R-1 defined by the registration module 34. The transfer module 33 and the separating and differentiating module 32 are shown in detail in FIGS. 13 through 15 which will be described in detail further below. It is to be noted that the stacks S-1 are all in the same preregistered positions on their respective worktables or boards B-1, and thus the position of the top workpiece being separated from the stack in the infeed station I-1 is known within certain acceptable tolerance variations which are not precise, for example such within 1 inch of the index marks. It is noted that the stacks may be somewhat angularly displaced also.

Consequently, when the transfer module 33 deposits the workpiece W-1 in the registration station R-1 it is in a generally known location or preregistered position behind certain edge stops 63 and within approximately 1 inch thereof, advantageously enabling the registration to occur properly. The preregistration assures that each workpiece arrives in the registration station R-1 in a position which is suitable for registration with its predetermined edges being in proper relationship with the edge stop means 63 in station R-1. This registration station R-1 includes a plurality of air jet units directing pulsating jets of air beneath the workpiece W-1 for gently moving it until two of it predetermined edges such as those adjacent a corner C are registered against the pair of edge stops 63 to bring the workpiece into accurately known position. This air jet registration is disclosed and claimed in a copending application of Herman Rovin and Fred J. Schiffmacher, Ser. No. 619,302 filed on Feb. 28, 1967 issued as U.S. Pat. No. 3,531,107 on Sept. 29, 1970. Alternatively, the registration may be carried out by revolving resilient fingers located beneath the worktable in the registration station and engaging the workpiece W-1 through a plurality of slots in the surface of the table as disclosed in my copending joint application with John H. Buettner referred to above.

After the workpiece W-1 has been registered against the edge stop means 63 it is transferred over as indicated by the arrow 64 onto a pair of temporarily stationary conveyor belts 65 and 66 of the belt conveyor stitching module 35.

It is noted that the conveyor belt 65 is a wide belt which supports the main body of the workpiece W-1, while the other conveyor belt 66 is narrower for supporting an edge portion upon which the workpiece W-2 is to be placed. There is a narrow gap 67 between these two conveyor belts, and the purpose of this gap is to enable the stitching path to be sewn across each of the workpieces, this stitching path coinciding with the gap 67 so as to avoid forming stitching in the belts themselves.

After a transfer module (not shown) has deposited the registered workpiece W-1 upon the conveyor belts 65 and 66 as shown in FIG. 2 by the arrow 64 then the conveyor belts are simultaneously indexed forward into their next dwell position wherein the workpiece W-1 is now opposite the registration and swing-over combining module 36.

The reader's attention is invited to the other separating and differentiating module 32, which is located near the registration and swing-over combining module 36. This module 32 serves partially to separate the top workpiece W-2 from the stack S-2 in the infeed station I-2 so that the transfer module 33 shown at the right of the module 32 can engage the partially separated top workpiece to transfer it over into a registration station R-2 wherein the workpiece S-2 is registered against a pair of edge stops 68. A registration and swing-over combining machine is disclosed and claimed in said copending application of Herman Rovin and Fred J. Schiffmacher, Ser. No. 619,302. Air jet units feed pulsating jets of air beneath the workpiece W-2 for moving its edges against the stops 68, as explained in said application.

After the workpiece W-2 is registered, a supporting surface 69 mounted on the end of a swingable arm lifts the registered workpiece W-2 and swings it up and over as indicated by the arrow 61 to deposit this registered workpiece W-2 upon the other workpiece W-1 in a combining station D-1.

It will be noted that this swinging of the support surface 69 up and over serves to invert the workpiece W-2. Accordingly, the stacks S-2 have all the workpieces W-2 therein upside down, that is with the finished surface of the cloth facing downwardly. Subsequently, when the support surface 69 deposits the registered workpiece W-2 upon the workpiece W-1, the workpiece W-2 is now right side up in readiness to be stitched to the workpiece W-1. For performing this stitching operation the stitching module 35 includes a conventional lockstitch sewing machine 71 and suitable photocell sensing equipment to start the sewing machine when the leading portions of the combined workpieces W-1 and W-2 approach the work station F for fastening the work, station F being defined by the sewing head of the sewing machine 71, and to stop the sewing machine and to cut the threads after the trailing edges of the workpieces have passed the sewing station F.

In order to hold the combined workpieces W-1 and W-2 in their properly registered positions on the moving conveyor belts 62 and 63 there are a pair of spaced toboggan-shaped resilient guides 72 and 73 having slippery lower surfaces which press down upon the moving workpieces W-1 and W-2 as urged by a plurality of oval-shaped strip steel springs 74. Thus, after passing through the work station F a line of lock stitches 75 has been made, serving to secure the backfacing W-2 to the pocket panel W-1, thus forming a new workpiece W-3 as indicated. Just before the line of stitches 75 is made the very edge of the facing piece W-2 is turned under neatly by suitable mechanism associated with the sewing machine 71 so as to prevent the exposure of a raw edge. This type of stitching operation and details of the belt conveyor stitching module 35 are disclosed and claimed in a copending application of Charles Szentkuti, Ser. No. 637,431 filed May 10, 1967 issued as U.S. Pat. No. 3,511,494 on May 12, 1970.

A further transfer module (not shown) serves to transfer the individual workpieces W-3 off from the conveyor belts 65 and 66 as indicated by the arrow 77 and to deposit these workpieces W-3 in a stack S-3 on the board B-3 which is in the preregistration stacking station as indicated at PR. By virtue of the fact that the conveyor belts 65 and 66 have delivered the sewn workpiece W-3 to a predetermined position, its position when transferred and deposited in the stack S-3 at the preregistration station PR is accurate to within plus or minus an acceptable tolerance variation, such as one-fourth of an inch.

As soon as the last workpiece of the stack S-3 is placed upon the stack, the transportable worktable or board B-3 is pushed along an outfeed track 79 of the stacking module 37 by the next empty board B-3 which then is ready to receive its stack, as explained in detail further below in connection with FIGS. 11 and 12. From the outfeed track 79 of the stacking module 37 the boards B-3 each carrying a preregistered stack S-3 slide onto a turntable conveyor 80 which is shown in greater detail and will be explained in connection with FIG. 7. After receiving one of the transportable worktables B-3 the turntable conveyor 80 is indexed through an angle 180° so as to place this board opposite the infeed track 82 of the infeed module 31 of the succeeding system 51. A limit switch (not shown) is actuated when the board B-3 has been pushed onto the turntable 80, and a pneumatic cylinder and push rod (not shown) mounted on the turntable serves to push the boards B-3 off from the turntable onto the infeed track 82.

Before describing the next system 51, it will be helpful to acquaint the reader with the fabric color variation problems which must be considered when programming the composite system 50, 51, 52 and 53 for manufacturing high-quality garments, garment components, and the like articles from a number of different workpieces. Although the cloth which is laid up layer by layer in the cutting room was dyed as one lot so as to have nearly as possible the same color along the entire length of the web, experience has shown that there are subtle variations in intensity or hue or shading which occur progressively along the length of the cloth web. In order to have a finished article wherein all of the parts are suitably matched in color, it is desirable to have these parts selected from points in the web of cloth which are as nearly adjacent one to another as possible. Accordingly, when the stacks S-2 of the workpieces W-2 are cut in the cutting room, and when other stacks S-4 (FIG. 3) of the workpieces W-4 are cut, those workpieces W-2 which originated from particular layers of the stack of laid-up cloth "belong" with those workpieces W-4, which originated from adjacent points in the same respective layers of laid-up cloth. It happens that there is no color variation matching problem with respect to the workpieces W-1, because these are pocket panels of neutral or buff color which are not normally visible in a completed pair of men's pants.

In order to assure that the workpieces of the respective stacks S-2 end up in the completed articles with the proper workpieces of the stacks S-4 to which they "belong," the respective transportable worktables B-2 as shown in FIG. 23, have identifying programming indicia 88, formed by a pattern of notches in the edge of each board B-2. These indicia 88 are arranged differently on the edge of each successive board so that it is automatically distinguished from every other board, for example the notches are arranged as digits of a numbering system to the base 2, i.e. a binary numbering system, each successive board bearing the next larger number. In addition the boards are numbered for quick and easy visual recognition by the operator who preregisters the stacks upon the boards B-2 and B-4. These indicia 88 are identified by a bank of sensing elements or probes 89 mounted in the infeed module 31 and which are moved against the edge of the board as indicated by the arrow 90. FIG. 8 is an enlarged perspective view of one of the infeed modules 31 showing the infeed track 82 along which the boards B-2 travel as they move toward the infeed station I-2 and showing the location of the sensing probes 89. Each of these probes 89 is spring biased toward the notches and is associated with a normally open switch (not shown). When the bank of probes 89 is moved against the edge of the board, those probes 89 which engage unrecessed edge portions are depressed relative to the other probes which engage into recessed portions; so that the relatively depressed probes actuate their associated switches to close them. These switches of the respective probes 89 are connected to a computer 90, and similarly the infeed module 31 (FIG. 3) which handles the boards B-4 has probes such as 89 which are individually connected through wires in an electrical cable 91 to the computer 90. This computer is programmed to give an alarm signal via a buzzer in the event that the relative order of the boards B-4 entering the infeed module 31 of the system 51 differs from the relative order of the corresponding boards B-2 which entered the system 50.

By virtue of the fact that the bank of sensing elements 89 is located near the entering end of the infeed track 82 (FIG. 8) the operator has available time to rearrange the order of the boards B-4 before they reach the infeed station I-4. These worktables or boards, as shown in FIGS. 22, 23, and 24, have semicircular cutouts 93 in their leading and trailing edges, providing finger clearance openings on opposite edges of each board so as to make it easier for the operator manually to pick up and rearrange the order of the boards when necessary.

FIG. 24 shows an alternative embodiment of the programming indicia 88 formed by holes in the edge portion of the boards B-2 or B-4. The sensing elements 89 comprise individual photocell units which respond to light radiating upwardly from a source 94 extending beneath and aligned with the location of the holes 88. The photocell units 89 when used are connected to the computer 90 and are positioned just above the boards B-2 or B-4 near the location shown in FIG. 8 for the sensing probes 89.

In order to complete the explanation of the programming of the composite system 50, 51, 52 and 53, it is to be noted that the stacks S-2 were inverted before being placed on the worktables B-2 so that all of the workpieces thereon are upside down, for reasons of the swing-over combining step 61 as explained above. Starting from the top and proceeding to the bottom in each stack S-2 the order of the workpieces W-2 will be referred to as A to Z, for purposes of reference. After restacking of the sewn workpieces W-3 in the stacks S-3, the first one sewn is on the bottom; thus, the order of the workpieces W-3 in their stacks S-3 is opposite to that from their original order in the stacks S-2. That is, assuming that the workpieces are arranged in the order A to Z in the stacks S-2, then the workpieces in the stacks S-3 are arranged in the order Z to A. Accordingly, it is desirable that the inverted workpieces W-4 which are being fed into the system 51 of FIG. 3 should be in their stacks S-4 in the same order Z to A with respect to their original order in the plys of laid-up cloth in the cutting room.

The particular system 51 as shown in FIG. 3 includes the same types of modules arranged in the same order as in the system 50, and therefore it is not believed necessary to list again each of these corresponding modules.

In operation of the system 51, the separating and differentiating modules 32 at the infeed station I-3 serves partially to separate and differentiate the top workpiece W-3 from the remaining workpieces in the stack S-3 on the worktable B-3 at the infeed station. As indicated by the arrow 62 this partially separated workpiece is then transferred by a transfer module (not shown) to the registration station R-3 of a registration module where it is registered against the stop means 63, thereafter being transferred to the conveyor belts 65 and 66 as indicated by the arrow 64. The transfer module which carries, as indicated at 62, the workpiece W-3 from the infeed station I-3 to the registration station R-3 serves to turn the workpiece W-3 through an appropriate small angle, as seen most clearly in plan view in FIG. 1B before depositing it into the registration station R-3. This turning of the workpiece W-3 during its transfer 62 is conveniently accomplished by using a transfer module of the type disclosed and claimed in my copending application Ser. No. 601,768 filed Dec. 14, 1966, such transfer module being equipped with a suction head for lifting the workpiece during its transfer.

This turning of the workpiece before placing it into the registration station R-3, assures that it is deposited in a desired preregistered position at R-3 so that predetermined respective edges of the workpiece arrive in spaced opposed relationship with the respective stops 63 against which these edges are to be registered. The reason for turning the workpiece is to have it oriented after registration so that the desired line of lockstitches 84 to be formed will be lined up with the desired stitching path as defined by the gap 67 between the conveyor belts 65 and 66, because the line of stitches 84, as seen most clearly in FIGS. 25 and 26 are disposed at an angle to the line of stitches 75.

The workpieces W-4 in the stacks S-4 on the boards B-2 are inverted and arranged in Z-to-A order, as discussed above. These workpieces W-4 are front facings to be sewn to the pocket panel assembly W-3. The separating and differentiating module 32 in the infeed station I-4 partially separates the top workpiece W-4 from the stack S-4, and then a transfer module shown by the arrow 70 transfers this workpiece W-4 over to the registration station R-4. After being registered there the workpiece W-4 is swung up and over at 61 to be deposited in the combining station D-2 upon the edge portion of the workpiece W-3 which is opposite from the edge thereof occupied by the sewn workpiece W-1.

The module 35 forms the line of lockstitches 84 and delivers the pocket panel assembly workpiece W-5 to the position opposite the preregistration position PR-3.

The workpieces W-5 (FIG. 3) are transferred as shown by arrow 77 into the preregistration station PR-3 and are stacked up on the boards B-5 until the stacks S-5 are completed, and then the boards B-5 are fed out along the outfeed track 79 of the stacker module 37. From the outfeed track 79 the boards B-5 each carrying a preregistered stack S-5 move onto a belt conveyor 81, which is shown in greater detail in FIG. 6, serving to carry the boards B-5 to the infeed track 82 of the infeed module 31 (FIG. 4) of the next system 52 which is shown in detail in FIG. 4.

The particular system 52 includes the following modules:
1. an infeed module 31,
2. a top workpiece separating and differentiating module 32,
3. a number of transfer modules such as the transfer modules described above, the presence of these modules being indicated by appropriate transfer arrows,
4. a registration module 34,
5. a belt conveyor overedge stitching (or serging) module 38, and
6. at the output of the system 52, a stacking module 37 which supplies transportable worktables or boards B-6.

In operation of the system 52 the separating and differentiating module 32 at the infeed station I-5 serves partially to separate and differentiate the top workpiece W-5 from the remaining workpieces in the stack S-5 on the worktable B-5 at the infeed station. As indicated by the arrow 62 this partially separated workpiece is then transferred by a transfer module (not shown) to the registration station R-5 provided by the registration module 34. The workpiece is registered against the pair of edge stop means 63 which serve to register accurately the coinciding curved edge portions of the pocket panel (originally W-1) and of the backfacing (originally W-2) sewn thereto. The reason for accurately registering these curving edge portions is that these are the edges to which the overedge stitching is to be applied by the overedge (serging) module 38. After the workpiece W-5 is registered in the station R-5, it is transferred, as indicated by the arrow 64, to a conveyor belt 95 of the overedge stitching module 38.

This belt 95 supports the main body of the workpiece W-5, with its edge portions which are to be stitched being allowed to project from the belt 95 so as to slide along on the smooth upper surface of the module 38 extending along adjacent to the conveyor belt 95. The method and apparatus for automatically sewing along contoured edge of a fabric workpiece as practiced and as embodied in the module 38 as described in detail and claimed in a copending application of Charles Szentkuti and Douglas G. Noiles, Ser. No. 554,884, filed on June 2, 1966, issued as U.S. Pat. No. 3,377,967 on Apr. 16, 1968, to which reference may be made. The module 38 includes a guide 96 having a slippery lower surface which holds the main body of the workpiece W-5 down against the conveyor belt 95 to prevent slippage between the workpiece and the conveyor belt, while the projecting edge portions of the workpiece W-5 are suitably guided by guide apparatus 97 so as to enter the fastening station F-3 provided by a serging sewing machine 98.

This type of serging or overedge sewing machine as shown at 98 is commercially available. There are photocell controls as explained in said application Ser. No. 554,884, for starting the sewing machine 98 just before the leading edge of the workpiece W-5 arrives at the fastening station F-3 and for stopping the sewing machine for controlling the cutting off of the chain of stitches after the trailing edge of the workpiece has passed beyond the photocell near sewing station F-3. Thus, the module 38 forms the overedge stitches 99 which are seen most clearly in FIGS. 25-29, serving to attach the outer edge of the backfacing to the pocket panel.

The conveyor belt 95 delivers the newly sewn assembly workpiece W-6 to a position opposite the preregistration station PR-4, and a transfer module (not shown) as indicated by arrow 77 transfers the workpiece W-6 over into a stack S-6 at this preregistration station. When the stacks S-6 on the transportable worktables B-6 are completed, the full boards B-6 are fed out along the track 79 of the stacker module 37. The boards B-6 slide onto a turntable conveyor 80 similar to that described further below, which is indexed through an angle of 180° so as to place this board B-6 opposite the infeed track 82 of the infeed module 31 of the succeeding system 53.

As an alternative embodiment for forming the overedge stitches 99, the system 52 may include a manipulating stitching module such as the module 41 of FIG. 5, instead of the module 38. This type of manipulating sewing apparatus for sewing along a contoured path suitable for use in the module 41 is shown in a copending application of Douglas G. Noiles, executed on Aug. 22, 1967, Ser. No. 663,033, filed Aug. 24, 1967, issued as U.S. Pat. No. 3,474,747 on Oct. 28, 1969.

The particular system 53, as shown in FIG. 5, includes the following modules:
1. an infeed module 31,
2. a top workpiece separating and differentiating module 32,
3. a number of transfer modules, whose presence is indicated by appropriate transfer arrows,
4. a registration module 34,
5. a pair of incremental creaser modules 39 arranged in sequence,
6. a folding creaser module 40, as shown in greater detail in FIGS. 16-21,
7. a manipulating sewing module 41,
8. a delivery table module 42, and
9. an outfeed stacker module 37.

In operation of the system 53, the separating and differentiating module 32 at the infeed station I-6 serves partially to separate and differentiate the top workpiece W-6 from the remaining workpieces in the stack S-6 on the worktable B-6 at the infeed station. FIG. 5 shows this separated workpiece already starting to be transferred over as indicated by the arrow 62 to the registration station R-6, which is provided by the transfer module 34. The curved bottom edge of the pocket panel assembly workpiece W-6 is registered against a pair of curved edge stops 100. After registration to bring the workpiece into an accurately known location, it is transferred as indicated by the arrow 64 over to a creasing work station G-1 provided by the first incremental creaser module 39. The creasing action at the station G-1 serves to turn back a narrow edge portion 101 (FIG. 25) and to crease it in position so as to eliminate a raw edge. This creased portion 101 extends along approximately one-half of the curved bottom edge 102 of the partially creased workpiece W-7.

As indicated by the arrow 83, the partially creased workpiece W-7 is transferred by a transfer module which also displaces the workpiece angularly. The transfer action 83 may be accomplished by sliding the workpiece along the table surfaces while turning it to a different angular position, as seen most clearly in plan view in FIG. 1D. Thus, it is moved into a second creasing work station G-1 provided by another incremental creaser module 39. The creasing action at the station G-2 serves to turn back a continuation of the narrow edge portion 103 (FIG. 26) to complete the creasing of the curved bottom edge of the fully creased workpiece W-8.

The sliding and turning transfer action 83 and the transfer module for accomplishing it and the forming of a completely creased edge by creasing increments thereof are described in detail and claimed in my copending application Ser. No. 601,768, filed Dec. 14, 1966, to which reference was made further above.

The fully creased workpiece W-8 is transferred as indicated by arrow 85 by using a transfer module having suction pickup means as shown in said application and with means for turning the workpiece so as to bring it into a folding and creasing station defined by a folding-creaser module 40. In station H-1 the workpiece is folded in half and creased along its centerline 104 (FIG. 27) to form a folded pocket assembly W-9, as shown by steps in FIGS. 16-21. Then, as shown by the arrow 86, the folded pocket assembly is transferred by sliding over onto the manipulating stitcher module 41. The structural details and operation of apparatus suitable for use in this module 41 are shown in the copending application of Douglas G. Noiles, Ser. No. 663,033, filed Aug. 24, 1967, referred to above. A clamp 105 engages down upon the workpiece and moves it through a fastening station F–4 in proper relation to a sewing machine 76 to produce the desired curved stitching path. A double line of lockstitches 106 (FIG. 27) are formed through the in-turned edge portions so as to close up the bottom of the pocket, thus completing the product P.

From the manipulating stitcher 41 the pocket product P is transferred by sliding over as indicated by arrow 87 to a delivery station on a table module 42. The pockets P are then transferred up and over onto a stack S–7 on a board B–7 in preregistration station PR–5. Thus the product is stacked neatly in preregistered position in readiness for use.

As seen in FIG. 28, the opening for entry of the hand into the pocket P exists between the front and rear facings W–4 and W–2, respectively. FIG. 29 illustrates the way in which the pocket P is adapted to be assembled with a pants leg panel.

In order to keep track of the whereabouts of the various workpieces which will ultimately "belong" with the respective leg panels 108, the respective transportable interlinking worktables B–3, B–5, B–6, B–7 and B–8 all may carry identifying indicia 88.

It is to be noted that when the facings are sewn onto the pocket panel, the thickness of the assembled workpiece is greater along the edge where there are two plies as compared to one ply in the central region. Thus, the central regions of the stacks of sewn workpieces sag down somewhat as compared with the double-ply edge regions. To avoid unduly complicating the drawing of perspective views, the stacks of sewn workpieces are shown as having flat tops.

Advantageously, the systems 50, 51, 52, and 53, can accommodate surges caused by temporary interruptions of production, such for minor repairs, to rethread the needle of a sewing machine, etc. There are cabinets 109 adjacent to the conveyors 80 and 81, and these cabinets have shelves 110 onto which the transportable worktables B can be placed together with their associated preregistered stacks for temporary storage. Moreover, the function of the infeed modules enables the worktables to queue up adjacent one to another in spite of the fact that they may have initially been spaced apart or have entered the infeed track 82 with nonuniform time intervals (random intervals) between arrivals.

FIGS. 8, 9 and 10 show details of the infeed modules 31, for example, such as the one in FIG. 2 for handling the boards B–2. The infeed track 82 is defined by a pair of angle iron members 111 connected by a bracket 112 and a plate 113, the track members 111 being mounted on a pivot shaft 114. Multiple small rollers 115, such as roller skate wheels, are mounted at spaced points along the track members 111 upon which roll the transportable worktables B–2, as shown in FIG. 10.

In order to cause the worktables B–2 to roll forwardly, an elevator cam 116 periodically lowers the forward end of the two track members 111, as shown in FIG. 10. This cam is mounted on a shaft 117 which can be rotated by an electric motor and gear reducer drive unit 118 through a pulley and V-belt drive 119. A cam follower roller 120 rides on the cam and is fastened to the plate 114 to lower and raise the track.

As the workpieces W–2 are removed one by one from the stack S–2, the forward end of the track 82 is progressively raised by the cam 116 so as to keep the top of the stack at approximately the same level. As the forward end of the track nears its fully raised position, a fixed abutment depresses a stop button 123 (FIG. 10) so as to move the button 123 below the level of the bottom of the adjacent board B–2. The stop 123 is spring biased upwardly by means of a spring in a casing 124 which is mounted on the end of a piston rod 127. There is a switch (not shown) associated with the casing 124 so as to be actuated when the button 123 is fully depressed, and this switch operates a solenoid valve causing a pneumatic cylinder 128 to retract the rod 127. The cylinder 128 is mounted upon bracket 112 and plate 113.

The spring-biased stop button 123 slides back beneath the first board, and as soon as the clearance opening 93 is reached the button 123 is pushed up by its spring so as to be located in front of the next board to control its forward movement as explained below.

When the last workpiece W–2 has been removed from the worktable B–2 in the infeed station I–2, then a switch-actuating finger (not shown) depending from the separating and differentiating module 32 is allowed to drop down through a trigger slot 121 (FIGS. 22, 23 and 24) of the worktable, closing a control switch and thus energizing the electric motor unit 118. The cam 116 turns lowering the track, and a control switch responsive to an actuator coupled to the camshaft 117 causes the cam to stop again when the track members 111 have been located at the desired position for a full stack in the infeed station.

The lowering of the track allows the empty board to roll forward off from the track and to slide down into a bin 125 stopping against a resilient bumper strip 126. While the track is lowered, switch means 122 cause the cylinder 128 to move its rod 127 gradually forward to its initial position to allow the full worktable to roll slowly forward into the infeed station I–2. At the forward end of the infeed track 82 is located a sensing switch (not shown) which is actuated when the full worktable has moved all of the way forward and also a sensing switch located near 122 is actuated when the track has been raised up to its operating position in the infeed station I–2. In this way an electrical control circuit is completed to permit the operation of the separating and differentiating module 32 to begin. As the workpieces are removed one by one, sensing means, for example such as a photocell or probe on a switch arm, is responsive to the position of the top of the stack and controls the cam drive unit 118 to raise the infeed track 82 slightly from time to time, thus keeping the top of the stack at approximately the same height.

The workpiece separating and differentiating module 32 is supported on a large bracket 130 which spans across between the sidewalls 131 of the infeed module 31. When the track members 111 have been raised back to their normal operating position, the top workpiece W–2 (FIG. 10) as shown in dashed and dotted outline is placed in proper position for operation of the separating and differentiating module 32.

The various modules of the systems 50, 51, 52 and 53 are controlled in their cycles of operation by rotary programming switches which are commercially available. Also, there are sensing switches (sometimes called limit switches in the electrical control circuit art) placed at appropriate points in the systems. These sensing switches are included in electrical interlock circuits to assure that each of the desired operations described above is carried through to completion before the next operation can begin. If desired, any one of the systems 50, 51, 52, or 53 can be used individually in production. Thus, for example, the system 50 can be employed by itself to sew on the backfacing, and then the remaining work on the pocket workpieces can be carried out with conventional production equipment.

This utility and capability of each system by itself is of advantage in making the transition from a conventional production arrangement to a composite automation system employing the present invention. First, the system 50 is installed in a plant, and operators are trained to supervise its operation, while the remainder of the plant carries on production in conventional ways substantially as before. Then secondly, the next system 51 is installed, and operators are trained to run it while the remainder of the plant continues in production, and so forth until the entire transition is completed. Moreover, the production capacity of the composite systems 50, 51, 52 and 53 is so large that they enable the low-cost production of side pockets for men's pants in standard sizes and neutral colors suitable to be sold as separate articles of commerce for purchase and subsequent use by other producers in making completed pants.

FIGS. 11 and 12 show details of the stacking module 37, for example such as the one shown at the outfeed of the system 50 in FIG. 2. A hopper 134 receives the supply of empty worktables B-3, these being loaded into the hopper in the desired order in which they are to be removed one at a time from the bottom. As seen in FIG. 12 the bottom worktable rests upon ledge support means 135 so that it can be pushed out of the hopper 134 through an exit slot 136 extending across the width of the hopper beneath a barrier wall 137.

When the system 50 has completed the predetermined number of cycles of operation corresponding to the desired number of workpieces in the stack S-3 (FIG. 2) at station PR-2, in this case 24 cycles, so that the stack S-3 is completed, then a solenoid air valve (not shown) is actuated by a programming switch for operating a cylinder 138 (FIG. 12). Its piston rod 139 is thereby extended, causing a pulley wheel 140 mounted on the end of the rod 139 to advance a cable 141 having an attached pusher element 142. The element 142 pushes the bottom worktable B-2 out through the exit slot 136, as indicated by the dashed and dotted outlines (FIG. 12) and by reference numbers 140', 141', 142' and B-2', thus delivering this worktable B-2' onto elevator support means 144 at the preregistration station PR-2. A constant tension spring 145 returns the pusher element 142 back to its initial position in readiness to feed out the next worktable.

The elevator support means 144 includes a pair of L-shaped elements 146 (FIG. 11) connected by a central plate 147 to which a cam follower roller 148 is attached. The roller 148 rides on a cam 149 driven by an electric motor and speed-reducing gear unit 150 connected to the camshaft as shown in FIG. 12. As soon as the cylinder 138 has pushed the empty worktable onto the elevator 144, a sensing switch (not shown) energizes the drive unit 150 to raise the elevator up into operating position for receiving the first workpiece of the stack to be placed thereon in preregistered position. As the stack is being built up piece by piece, sensing means 152, such as a photocell or probe, senses the position of the top of the stack and controls the cam drive unit 150 to lower the elevator, thus keeping the top of the stack at approximately the same height for receiving the successive workpieces S-3 (FIG. 2). The elevator 144 includes slidable sleeves 153 which move along vertical guide rods 154. When the stack is completed, the elevator 144 is returned by the motor unit 150 to its initial lowermost position aligned with the rollers 115 of the outfeed track 79.

Thus, when the cylinder 138 is caused to push the next empty worktable into position on the elevator 144, the recently filled worktable is thereby pushed outwardly over the rollers 115 of the track 79, and it serves to push the previously filled worktables ahead of it along the track between the sidewalls 155 of the stacker module 37.

In FIG. 13 is seen apparatus for use in a module 32 for partially separating a top workpiece W from a stack S of workpieces and for differentiating this top workpiece W from the next one. Also seen in transferring apparatus 33 for use in a transfer module for moving this piece W over into the next station as indicated in dashed and dotted outline at W'.

The apparatus 32 is adapted for mounting on a bracket 130 and includes a revolvable cylindrical member 158 having a high-friction surface, for example as provided by carding cloth cemented to the member 158 with the bristles of the carding cloth extending forwardly in the direction of rotation. A first clamp means 160 is adapted to press against the top workpiece W in front of the revolvable member 158, and second clamp means 162 engages down on the remainder of the stack which becomes partially exposed after the top workpiece has been partially separated therefrom as seen in FIG. 13. An electric motor and speed-reducing drive means 163 within a housing serve to revolve the cylindrical member 158 and to turn a camshaft (not shown) having a plurality of cams for operating the apparatus 32. One of the cams actuates movable support mechanism 164 for raising and lowering the member 158 together with the first clamp means 106, and the other cam actuates the second clamp means 162 to engage the exposed region of the next workpiece in the stack, as shown in FIG. 13. The action of the apparatus 32 is such that solely the top workpiece W is partially separated from the stack. This partial separating and differentiating apparatus 32 is disclosed in detail and claimed in a copending application of Charles Szentkuti, Ser. No. 603,990, filed Dec. 22, 1966 issued as U.S. Pat. No. 3,422,505 on May 6, 1969.

The transfer apparatus 33 includes a plurality of suction cups 166 having high-friction lower surfaces such as provided by strips of carding cloth with their bristles near the suction mouth. This structure of the suction cups 166 is also disclosed and claimed in said application of Charles Szentkuti. A suction manifold 167, which carries the cups 166, is connected through a flexible hose (not shown) to a suction line, the suction applied to the cups being controlled by a solenoid valve, as will be understood.

The manifold 167 can be raised or lowered by the plunger of a pneumatic cylinder 168 mounted upon a carriage 169 slidable along a guide rod 170. The carriage 169 is driven back and forth along its guide rod 170 by means of a chain drive arrangement, the chain passing around a plurality of sprockets. This type of chain drive for transfer apparatus is shown and described in detail in the above-identified joint application with John H. Buettner.

When the carriage 169 is in its initial position shown in full lines in FIG. 13, a limit switch within the housing 163 responds to completion of the cycle of operation of the module 32 to energize a solenoid valve, thus causing the cylinder 168 to lower the suction cups 166 down into engagement with partially separated workpiece W, as indicated at 166'. The suction is turned on so as to grip firmly the front end of the partially separated workpiece W. Then carriage 169 is moved forward to transfer the workpiece into the next station, as indicated by the dashed and dotted outlines at W', 166', 167', 168' 169'. At this time the suction is turned off to release the transferred workpiece W', and the cylinder 168' raises the suction cups 166'. Finally, the carriage returns to its initial position at 169 while the suction cups 166 remain elevated to complete the transfer cycle.

An alternative form of transfer apparatus which may be employed in the transfer modules 33 is that which is disclosed and claimed in my copending application Ser. No. 601,768 to which reference is made above.

FIGS. 14 and 15 show alternative apparatus 32 for use in the modules for partially separating and differentiating the top workpiece W from a stack S. The apparatus 32 includes a vertically movable support column 172 which is mounted upon a bracket 130 (FIGS. 9 and 10) by a sliding connection to permit up and down movement of the column 172. Extending generally parallel to the column 172 is an operating rod 173 (FIGS. 14 and 15) which is mounted for up and down movement relative to the column 172. A link member 174 is pivotally connected at 175 to a clevis on the lower end of the column 172 and is attached by a pivot 176 to the rod 173. Another link 178 extends generally parallel with the first link member 174 and is pivotally mounted at 179 on column 172, also being pivotally connected at 180 to the operating rod 173. It is to be understood that the apparatus 32 of FIGS. 14 and 15 has drive means (not shown in FIGS. 14 and 15) such as shown at 163 in FIG. 13, including an electric motor, speed-reducing gear train and camshaft for sequentially moving up and down the support column 172 and operating rod 173.

In order to begin separating the workpiece W from the stack S, the column 172 and rod 173 are both moved down to bring the link member 174 down adjacent to workpiece W so that a length of sticky tape 182 which extends along beneath link member 174 engages workpiece W. This sticky tape 182 has a pressure-sensitive adhesive surface, for example such as masking tape, and is supplied from a reel 183 mounted upon one end of the link 178. The tape 182 extends from the reel 183 down around a small pulley roller 185 mounted on one end of the link member 174, along beneath the member 174, up around another small pulley roller 186 mounted on the other end of the member 174, and then up to a takeup reel 184 mounted on the end of the link 178.

The reason for the supply and takeup reels 183 and 184 is that after a few cycles of operation the lower surface of the length of tape 182 beneath the member 174 becomes somewhat covered with fibers of the fabric which interfere with the desired adherence. To feed a fresh sticky tape surface down into the region 182 beneath the member 174, the takeup reel 184 is indexed from time to time by a ratchet mechanism (not shown).

From the foregoing it will be understood that the apparatus of FIGS. 14 and 15 described above comprise pickup head means generally indicated at 188 presenting a sticky surface 182 which is engageable with the top workpiece W for adhering thereto. Moreover, the lower portions of column 172 and rod 173 and member 174 and link 178 constitute a parallelogram linkage, enabling the sticky surface 182 to be canted upwardly in either direction with respect to the horizontal, as seen by comparing FIGS. 14 and 15, for reasons to be explained further below.

After the adherent surface 182 has engaged the workpiece W, the pickup head means 188 are raised slightly, with the rod 173 being raised more than column 172. This action tips the sticky surface 182 upwardly toward the left in FIG. 14, and lifts the adjacent area of the workpiece W so as to cant it upwardly toward the left. The reason for carrying out this action is to overcome the problem that occasionally more than one workpiece is picked up simultaneously, the lower one or ones tending to adhere with the top workpiece W.

In order to differentiate the top workpiece W from any other one or ones which may happen to adhere therewith, a friction wheel 190 is rotatably mounted on a movable arm 191. This wheel has a periphery of high-friction material, such as crepe rubber, and it is revolved by a belt and pulley system 192 connected to the differentiating wheel 190 through a flexible shaft 193. The arm 191 is reciprocated by suitable drive means, such as a pneumatic cylinder, so as to pring the periphery of the wheel 190 adjacent to the lower surface of the tipped-up workpiece W to dislodge any "double" or "triple" workpiece.

If there is any workpiece or workpieces ("doubles" or "triples") which were picked up with the workpiece W, the rotating wheel 190 brushes the additional piece or pieces off from the workpiece W so as to return them to the top of the stack. Then, the wheel 190 is withdrawn, and clamp means 194 are moved down to clamp the stack S in place.

The suction transfer cups 166 are included in transfer apparatus 33 such as shown in FIG. 13 or alternatively in transfer apparatus such as shown in my copending application Ser. No. 601,768 to which reference is made above. The suction cups 166 are engaged down upon the workpiece W on the opposite side of the stack from that which is clamped by the clamp means 194. Then, the column 172 is raised relative to the rod 173 so as to tip the adherent surface 182 upwardly toward the right, as seen in FIG. 15, toward the suction transfer means 166. The reason for canting the adherent surface 182 upwardly toward the transfer means 166 is to aid the transfer means 166 in stripping or peeling the workpiece W off from the adherent surface 182 as the transfer means 166 moves over toward the next station as shown by the arrow 195. Thus, the top workpiece W is transferred over to the next station in the system, which is the registration station. Then the suction cups 166 are returned to their initial positions to complete the cycle in a manner similar to that described in connection with FIG. 13.

FIGS. 16–21, inclusive, show details of the structure and cycle of operation of the folding and creasing module 40 included in the system 53, FIG. 5. The workpiece, after having its bottom edge turned in and creased as shown in FIG. 26, is transferred into the folding and creasing station H-1 (FIG. 5) provided by the module 40. This module 40 includes an upper arm 198 (FIG. 16) having a leg 199 rigidly secured to the end of the arm with a clamp plate member 200 secured to the leg 199. This arm 198 extends out from activating mechanism 201 (FIG. 5) projecting above the level of the work-supporting surface 202 (FIGS. 17, 19, 21) of module 40. A second arm 203 extends from the activating mechanism 201 with a folding and creaser plate number 204 attached thereto. Mounted upon the lower arm 203 is a pneumatic cylinder operating means 205 for moving a piston rod 206 connected to yoke elements 207 and 208. These yoke elements are attached to the ends of a movable rod element 209 extending across the top of plate 204 generally parallel with the desired fold line 104 (Please see also FIG. 27). The plate members 200 and 204 have edges 210 and 211, respectively, which extend parallel with each other and with the desired fold line 104.

The arm 203 and plate 204 are initially positioned down adjacent to the work-supporting surface 202, while the clamp plate 200 is held up initially away from the surface 202. Accordingly, when the workpiece W-8 is deposited in the folding and creasing station, it is placed down with its one half (the right half in FIG. 17) resting upon the surface 202, while its other half is resting upon the plate 204 and upon the rod element 209.

The first step in the operation is that the clamp plate member 200 is moved down as indicated by the arrow 212 (FIG. 16) to clamp one-half of the workpiece W-8 down firmly against the supporting surface 202, as seen in FIG. 17, with the edge 210 immediately adjacent to the fold line 104. Then the folder and creasing plate 204 is raised and moved as indicated by the arrow 214 so that its edge 211 is spaced above and in overlapping relationship with the edge 210, as seen in FIG. 17.

Next, the plate 200 is slid away from the fold line 104, as shown by the arrow 216 in FIGS. 18 and 19, and the folder and creaser plate 204 is pressed down firmly as indicated by the arrow 218 for pressing the fold 104 to form a crease in the workpiece. In order to complete folding the workpiece over in half, the clamp plate 200 is raised as shown in FIG. 20 by the arrow 220 for providing clearance beneath it, and the operating means 205 is activated to move the rod element 209 as shown by arrow 222. As the rod element 209 moves toward the right, it pushes upon the portion of the workpiece which was resting upon the plate 204 so as to flip this portion W-8' over onto the lower half of the workpiece. FIG. 21 shows the rod element intermediate position in dashed and dotted outline at 209' while moving to push the upper portion W-8' over on top of the other half. Also, in FIG. 21 the rod element 209 is shown in cross section in the position it occupies at the conclusion of its stroke. The final step is for the rod element 209 to be retracted to its initial position above the plate 204. This completes the folding of the workpiece in half with its bottom edges turning in to hide the raw edges, thus forming the workpiece W-9 in readiness to be sewn closed at 106 (FIG. 27). It should be understood that the actuating mechanism 201 (FIG. 5) for the module 40 includes an electric motor and speed-reducing drive and a plurality of cams for producing the cycle of motions described above. It will be appreciated that the systems 50, 51, 52 and 53 are extremely adaptable in operation. If for any reason any one of the modules should become malfunctioning or need to be repaired, it can be quickly replaced by another identical module so as to carry on with production. If replacement equipment is not immediately available, the modular arrangement and accessibility of the various stations is such, in many cases, as to enable a human operator to stand beside the system to perform manually a particular step or steps not being performed by the malfunctioning apparatus. Thus, advantageously, the user of systems embodying this invention has assurance for many of the operations that he will be able to continue to utilize the equipment even if one or more of the modules happens to be inoperative for a period of time.

The serging sewing machine 98 in the module 38 may include trimming apparatus for trimming off a narrow portion along the edge of one of the workpieces before the overedge stitches are applied. This trimming equipment is commercially available in overedge (serging) stitching machines.

Moreover, if any one of the particular systems 50, 51, 52, or 53 must be entirely shut down for a period of time, then it is possible manually to perform the various operations in an off-line location. The only requirement is that at the conclusion of the manual work the completed workpieces be stacked in preregistered positions in appropriate order on the proper worktables.

The systems 50, 51, 52 and 53 are all operating with the same production rate, i.e. the same cycle time per workpiece. In installations where the cycle time per workpiece is different for the respective systems of an composite system, then one or more of the systems can have a duplicate or duplicates arranged in parallel production relationship therewith for more nearly balancing, i.e. substantially equalizing, their over all production rates.

It is noted that these systems utilize a substantial number of transportable interlinking preregistration worktables B. However, these can be made of inexpensive board material such as plywood, "Masonite," pressed chipboard, etc. Moreover, instead of having the indicia formed by notching or cutting or drilling the worktables, the indicia may be formed in metal plates attached to the edge of the worktables B. Also, in order to use the same worktable at various times for various sizes of workpieces, multiple sets of registration lines 30 are desirably provided. These registration lines for the various sizes of workpieces can be marked on the worktables in various colors for color-coding purposes so that the operators can correlate a certain color with a certain size of workpiece.

While the invention has been described in detail with respect to certain specific illustrative embodiments of processes, systems and composite systems for automating the manufacture of side pockets for men's pants, and components thereof, it will be understood that various changes and modifications of the illustrative embodiments will become apparent to those skilled in the art for adapting the processes and systems for manufacturing various products and components of wearing apparel, headgear, footwear and the like articles within the spirit of the invention and within the scope of the appended claims. The terms and expressions which I have employed are used in a descriptive and not a limiting sense and I intend to include equivalents of the invention described and claimed in the appended claims.

1. A process for automating the manufacture of wearing apparel, headgear, footwear, and similar products from a plurality of different fabric workpieces comprising the steps of placing a plurality of first workpieces on a first transportable worktable in preregistered position thereon, placing a plurality of second workpieces different from said first workpieces on a second transportable worktable in preregistered position thereon, moving said first worktable into a first infeed station adapted to differentiate an individual workpiece from the remaining workpieces on said first worktable and positioning said first worktable in said first infeed station to bring said preregistered first workpieces thereon into predetermined coordinated relationship therewith for automatically differentiating and removing said first workpieces from said first worktable one at a time, registering said first workpieces one at a time to bring them individually into accurately known location, moving said second worktable into a second infeed station adapted to differentiate an individual workpiece from the remaining workpieces on said second worktable and positioning said second worktable in said second infeed station to bring said preregistered second workpiece thereon into predetermined coordinated relationship therewith for automatically differentiating and removing said second workpieces from said second worktable one at a time, registering said second workpieces one at a time to bring them individually into accurately known location, combining respective ones of said second workpieces with respective ones of said registered first workpieces, and fastening together the respective combined first and second workpieces to form a plurality of substantially identical products.

2. A process for automating the manufacture of wearing apparel, headgear, footwear, and similar products as claimed in claim 1 wherein said substantially identical products are components of other articles to be formed, said process including the steps of moving a third transportable worktable into a preregistration station, and placing said products one at a time on said third worktable in preregistered position thereon in readiness for performing further work thereon.

3. A process for automating the manufacture of wearing apparel, headgear, footwear, and similar products from a plurality of different workpieces as claimed in claim 1 in which the removing of said first workpieces from said first worktable one at a time and the registering of said first workpieces one at a time, comprise the steps of differentiating each workpiece from the others remaining upon said first worktable, transferring each differentiated workpiece individually into a registration station, and registering each workpiece individually in said registration station and in which the removing of said second workpieces from said second workpieces one at a time comprise the steps of differentiating each workpiece from the others remaining upon said second worktable, transferring each differentiated workpiece individually into a second registration station, and registering each workpiece individually in said second registration station.

4. A process for automating the manufacture of wearing apparel, headgear, footwear, and similar products as claimed in claim 1 including the steps of providing indicia on at least one of said transportable worktables corresponding to predetermined characteristics of the workpieces thereon, and sensing the indicia for identifying the workpieces in the infeed stations.

5. A process for automating the manufacture of wearing apparel, headgear, footwear, and similar products as claimed in claim 4 wherein said indicia are sensed prior to the arrival of the worktable in the infeed station.

6. A process for automating the manufacture of wearing apparel, headgear, footwear, and similar products from a plurality of different fabric workpieces comprising the steps of placing a plurality of first workpieces in a first stack of a first transportable worktable in preregistered position thereon, restraining said first stack solely by friction between the bottom of said first stack and said first worktable placing a plurality of second workpieces different from said first workpieces in a second stack on a second transportable worktable in preregistered position thereon, restraining said second stack solely by friction between the bottom of said second stack and said second worktable, moving said first worktable into a first infeed station adapted to separate individual workpieces from the top of said first stack on said first worktable and positioning said first worktable in said first infeed station to bring said preregistered first stack of workpieces thereon into predetermined coordinated relationship therewith for automatically separating and removing said first workpieces from the top of said first stack one at a time, registering said first workpieces one at a time to bring them individually into accurately known location, moving said second worktable into a second infeed station adapted to separate individual workpieces from the top of said second stack on said second worktable and positioning said second worktable in said second infeed station to bring said preregistered second stack of workpieces thereon into predetermined coordinated relationship therewith for automatically separating and removing said second workpieces from the top of said second stack one at a time, registering said second workpieces one at a time to bring them individually into accurately known location, bringing together the respective ones of said registered first workpieces with respect to their order of occurrence in said stacks, and fastening together the respective first and second workpieces to form a plurality of substantially identical products.

7. A process for automating the manufacture of wearing apparel, headgear, footwear, and similar products from a plurality of different fabric workpieces as claimed in claim 6 comprising the steps of providing indicia on at least one of said worktables corresponding with predetermined characteristics of the stack of workpieces thereon, and sensing said indicia for identifying the stack.

8. A system for use in manufacturing wearing apparel, headgear, footwear, articles of clothing, components thereof, and similar products from fabric workpieces comprising a plurality of transportable worktables adapted for carrying multiple-fabric workpieces in stacks upon each worktable in predetermined approximate coordinate positioned relationship with respect to the respective worktable on which the workpieces are carried, a plurality of infeed modules for feeding the worktables into known coordinate locations one at a time in sequence, a plurality of differentiating modules for differentiating the top workpieces on the stacks from the remainder thereof, a plurality of registration modules, a work-performing module, a plurality of transfer modules, one of said transfer modules transferring the differentiated workpieces from one of said infeed modules to one of said registration modules, another of said transfer modules transferring differentiated workpieces from another of said infeed modules to another of said registration modules, combining means for combining the registered workpieces before said work-performing module, and another of said transfer modules transferring the combined registered workpieces toward said work-performing module.

9. A system for use in manufacturing wearing apparel, headgear, footwear, articles of clothing, components thereof, and similar products from fabric workpieces as claimed in claim 8 in which said combining means is included in one of said registration modules.

10. A system for manufacturing wearing apparel, headgear, footwear, articles of clothing, components thereof, and similar products from fabric workpieces comprising a plurality of transportable worktables adapted for carrying multiple-fabric workpieces in stacks upon each worktable in predetermined approximate coordinate positioned relationship with respect to the respective worktable on which the workpieces are carried, a plurality of infeed modules for feeding the worktables into known coordinate locations one at a time in sequence, a plurality of differentiating modules for differentiating the top workpieces on the stacks from the remainder thereof, a plurality of registration modules, a work-performing module, a plurality of transfer modules, one of said transfer modules transferring the differentiated workpieces from one of said infeed modules to one of said registration modules, another of said transfer modules transferring differentiated workpieces from another of said infeed modules to another of said registration modules, combining means for combining the registered workpieces before said work-performing module, another of said transfer modules transferring the combined registered workpieces toward said work-performing module, a stacking module for feeding the worktables one at a time in sequence into a stacking station, and another of said transfer modules transferring the workpieces from said work-performing module onto the worktable at said stacking station to form a stack of workpieces thereon upon which the work has been performed.